(12) United States Patent
Beysserie et al.

(10) Patent No.: US 9,787,902 B1
(45) Date of Patent: Oct. 10, 2017

(54) VIDEO IMAGE STABILIZATION WITH ENFORCED STABILIZATION CONSTRAINTS

(71) Applicant: Apple Inc., Cupertino, CA (US)

(72) Inventors: Sebastien X. Beysserie, San Jose, CA (US); Jianping Zhou, Fremont, CA (US); Stephane S. Ben Soussan, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/179,680

(22) Filed: Jun. 10, 2016

(51) Int. Cl.
*H04N 5/228* (2006.01)
*G03B 39/00* (2006.01)
*H04N 5/232* (2006.01)

(52) U.S. Cl.
CPC ..... *H04N 5/23267* (2013.01); *H04N 5/23258* (2013.01)

(58) Field of Classification Search
CPC .... H04N 5/23248; H04N 5/144; H04N 19/51; H04N 19/537; H04N 1/212; H04N 5/23264; G06T 7/20; G06T 2207/10016; G06T 2207/20201
See application file for complete search history.

(56) References Cited

U.S. PATENT DOCUMENTS

| | | | |
|---|---|---|---|
| 7,359,563 B1 | 4/2008 | Dua | |
| 7,705,667 B2 * | 4/2010 | Kousai | H03H 11/1291 327/553 |
| 7,817,187 B2 | 10/2010 | Silsby | |
| 8,134,603 B2 * | 3/2012 | Auberger | H04N 5/23248 348/208.3 |
| 8,335,350 B2 | 12/2012 | Wu | |
| 8,520,084 B2 | 8/2013 | Tsai | |
| 8,711,233 B2 | 4/2014 | Jefremov | |

(Continued)

FOREIGN PATENT DOCUMENTS

WO 2014147285 A1 9/2014

OTHER PUBLICATIONS

Zhou, et al., "Video Rolling Shutter Correction for Lens Movement in Optical Image Stabilization Cameras," U.S. Appl. No. 14/547,107, filed Nov. 18, 2014.

*Primary Examiner* — Trung Diep
(74) *Attorney, Agent, or Firm* — Blank Rome LLP

(57) ABSTRACT

Techniques to improve a digital image capture device's ability to stabilize a video stream—while enforcing desired stabilization constraints on particular images in the video stream—are presented that utilize an overscan region and a look-ahead technique enabled by buffering a number of video input frames before generating a first stabilized video output frame. More particularly, techniques are disclosed for buffering an initial number of input frames so that a "current" frame can use motion data from both "past" and "future" frames to adjust the value of a stabilization strength parameter and/or the weighted contribution of particular frames from the buffer in the determination of stabilization motion values for the current frame. Such techniques keep the current frame within its overscan and ensure that the stabilization constraints are enforced, while maintaining desired smoothness in the video stream. In some embodiments, the stabilization constraint may comprise a maximum allowed frame displacement.

20 Claims, 15 Drawing Sheets

(56) References Cited

U.S. PATENT DOCUMENTS

| | | | |
|---|---|---|---|
| 8,749,644 B2 | 6/2014 | Lee | |
| 8,786,716 B2 | 7/2014 | Zhou | |
| 8,947,529 B2 | 2/2015 | Strine | |
| 9,100,575 B2 | 8/2015 | Lee | |
| 9,413,963 B2 | 8/2016 | Beysserie | |
| 2004/0001147 A1* | 1/2004 | Vella | H04N 5/145 348/208.99 |
| 2006/0257042 A1* | 11/2006 | Ofek | G06T 5/005 382/255 |
| 2010/0124379 A1* | 5/2010 | Bruna | H04N 19/86 382/236 |
| 2011/0037861 A1* | 2/2011 | Auberger | H04N 5/144 348/208.4 |
| 2011/0096179 A1 | 4/2011 | Border | |
| 2011/0234825 A1 | 9/2011 | Liu | |
| 2012/0120265 A1* | 5/2012 | Klomp | G06T 7/246 348/208.6 |
| 2013/0135430 A1 | 5/2013 | Liu | |
| 2013/0141602 A1 | 6/2013 | Kuriyama | |
| 2013/0294655 A1 | 11/2013 | Lim | |
| 2014/0132784 A1 | 5/2014 | Chouly | |
| 2014/0160309 A1 | 6/2014 | Karpenko | |

* cited by examiner

VIDEO IMAGE STABILIZATION WITH ENFORCED STABILIZATION CONSTRAINTS

TECHNICAL FIELD

This disclosure relates generally to the fields of digital photography and digital videography. More particularly, but not by way of limitation, it relates to techniques for improved stabilization of video image frames, wherein particular stabilization constraints have been placed upon certain video image frames in a time-sequenced set of video images.

BACKGROUND

With the application of software-based and/or hardware-based stabilization technology, jitter caused by camera movement may be minimized, making it possible to transform shaky, handheld footage into steady, smooth shots. One way to stabilize a video is to track a salient feature(s) in the image and use this as an anchor point to cancel out all perturbations relative to it. This approach requires a priori knowledge of the image's content to, for example, identify and track a person or other salient object in the scene. Another approach to image stabilization searches for a "background plane" in a video sequence, and uses its observed distortion to correct for camera motion. In yet another approach, known as "optical image stabilization," gyroscopically controlled electromagnets shift a floating lens element orthogonally to the optical axis along the horizontal and vertical plane of the image in a direction that is opposite that of the camera movement. Doing this can effectively neutralize any sign of camera shake. In a similar type of operation, a camera's imaging sensor may be translated in the opposite direction of the camera's movements in order to dampen the effects of camera shake.

One limitation of current video stabilization techniques is that they are not capable of applying particular stabilization constraints to a particular selected image(s) in an incoming video sequence. For example, if a user desired for a particular image in an incoming video sequence to be completely stabilized (or stabilized within a maximum allowed displacement, such as +/−4 pixels in any direction), current techniques do not provide a way to 'steer' the stabilization trajectory of the incoming video sequence (as it is being stabilized) towards the position of the selected image(s) such that, when the video sequence is stabilized, the particular stabilization constraints may be met for the selected image (s) without presenting any visibly jarring jumps in the stabilized video sequence as the selected image(s) is reached during the playback of the stabilized version of the video sequence.

The difficulties associated with stabilizing video frames while applying particular stabilization constraints to a particular selected image(s) in a video sequence are further exacerbated in implementations wherein it is desired that only a single version of the stabilized video sequence be stored in memory and multiple images in the incoming video stream are selected to meet one or more particular stabilization constraints. When such "multiple selected image" video sequences are stabilized, the stabilized videos may look unnatural and jarring if the stabilization process does not steer the video stabilization trajectory towards the selected images in an intelligent fashion. Moreover, without keeping separate versions of the video sequence in memory (e.g., one version for each "selected" image), the steered video stabilization trajectory must be shared in such a way as to provide as best possible overall outcome, rather than steering the trajectory solely to meet the stabilization constraint for a first one of the selected images.

Thus, what is needed are techniques to modulate a video stabilization strength parameter and/or the weighting values applied to individual frames in the determination of frame stabilization motion values for a sequence of video frames based, at least in part, on one or more video frames in the sequence that have been selected to meet one or more particular stabilization constraints. Such techniques are also preferably computationally efficient.

SUMMARY

In one embodiment, the disclosed concepts provide a method to stabilize a video stream as it is being captured. The method includes capturing a first time-sequenced set of images (e.g., a video stream), where each image has a capture time and, optionally, motion data (e.g., the motion data provided by one or more motion sensors such as gyroscopes or accelerometers, or motion data that is gathered through image processing analysis). In some embodiments, the time sequenced set of images may comprise a "current" image, a first one or more "past" images captured prior to the current image, and a second one or more "future" images captured after the current image.

In some embodiments, the method includes identifying the current image from the first time-sequenced set of images and identifying a first stabilization strength parameter value for the current image. The first stabilization strength parameter value may, in turn, be used to determine an individual weighting value (i.e., contribution) of each frame in the first time-sequenced set of images. In some embodiments, the first stabilization strength parameter value may comprise a standard deviation of a Gaussian weighting function that is used to assign the weighting values to each frame in the first time-sequenced set of images. The weighting value for each frame may be multiplied by the respective frame's motion data to determine the stabilization motion values that should be applied to the current frame.

In some embodiments of video image stabilization described herein, the actual size of the image frames captured by the device's image sensor will be larger than the dimensions of the visible frame that is displayed to a user in the resultant assembled stabilized video sequence. The extra pixels, usually around the outer edges, of the captured image frame that are not typically displayed to the user are also referred to herein as the "overscan" region. During video image stabilization, the visible frame of one or more of the captured video frames may be 'pushed into' the overscan region by the stabilization algorithm, in order to account for motion of the device between the capture of the video frames. For example, if a user's hand shakes upwardly by the equivalent of ten pixels between the capture of two video frames, a video stabilization algorithm may move the visible frame of the second captured frame (i.e., what a user will see for the second frame in a resultant stabilized video sequence) downward by ten pixels, so that there is no noticeable movement of the camera in the stabilized video sequence between the two frames.

The stabilization motion values mentioned above, which are determined based on the respective weighting values and motion data of the frames in the time-sequenced set of images, refer to the amount (and direction) by which the visible portion of a given frame will be pushed into its overscan region in order to stabilize the frame. In some embodiments, the stabilization motion values may take the form of two-dimensional translations, e.g., an adjustment in an 'x-direction' and an adjustment in a 'y-direction.' In more complicated embodiments, the stabilization motion values may specify motion in three dimensions, e.g., the amounts that an image needs to be warped, rotated, perspective corrected, etc., in order to be transformed into a stabilized form.

The method may also determine an adjustment to one or more of the determined weighting values for the images in the time-sequenced set of images that has been "selected" or designated to meet one or more particular stabilization constraints. The initial weighting values set by the weighting function determined using the first stabilization strength parameter value may be adjusted based, at least in part, on the proximity of the respective image's capture time to the capture time of the current image. By adjusting the determined weighting values, the video stabilization process may achieve a smoother trajectory towards meeting the one or more particular stabilization constraints of the "selected" frames.

Finally, the method may determine adjusted stabilization motion value(s), i.e., based on the adjusted weighing values, and apply them to the current image, in order to stabilize the current image and then store the stabilized current image in a memory. Each image in the time-sequenced set of images may then be shifted by one position, i.e., the oldest captured image may be discarded from the buffer, each image may be moved one position towards the past, and a new image may be read in, and the process may be repeated for the next image in the set. A computer executable program to implement the method may be stored in any media that is readable and executable by a computer system.

DETAILED DESCRIPTION

Figure 1A:
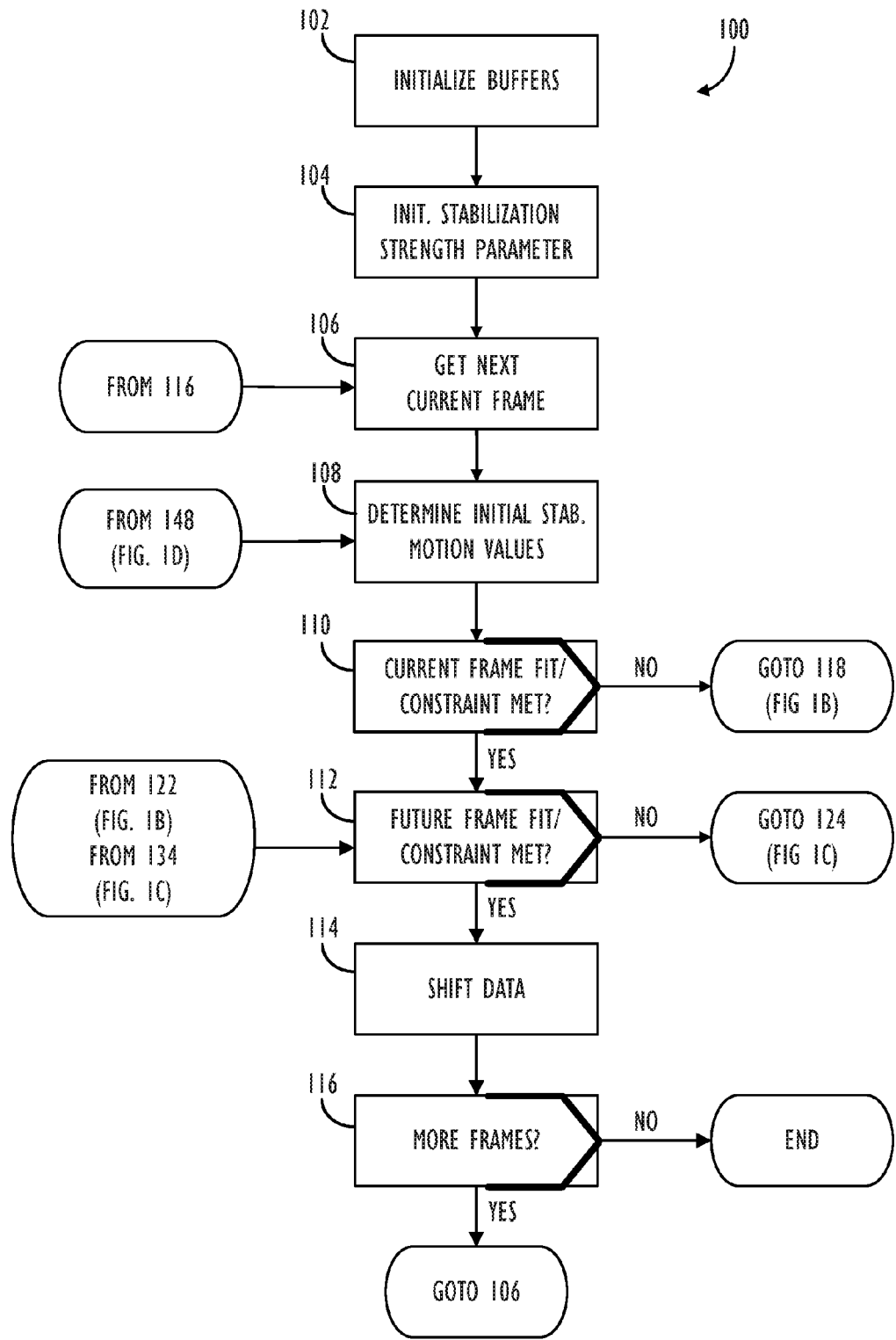
FIGS. 1A-1D show, in flowchart form, a video stabilization operation, in accordance with one embodiment.

This disclosure pertains to systems, methods, and computer readable media to more effectively stabilize video in real-time (i.e., as it is captured). In general, techniques are described herein for stabilizing video images using an "overscan" region and an optional look-ahead buffer comprising a number of video input frames, although it is to be understood that the video image stabilization improvement techniques described herein may be employed in conjunction with any desired video image stabilization approach. (As mentioned above, "overscan" is the term given to the buffer of pixels around the edges of an image that are larger than what is typically shown to a user.)

More particularly, techniques are disclosed herein for applying particular stabilization constraints to a particular selected image(s) in an incoming video sequence. For example, if a user desired for a particular image in an incoming video sequence to be completely stabilized (or stabilized within a maximum allowed displacement, such as +/−4 pixels in any direction), the techniques disclosed herein provide an intelligent way to steer the stabilization trajectory of the incoming video sequence (as it is being stabilized) towards the position of the selected image(s) such that, when the video sequence is stabilized, the particular stabilization constraints may be met for the selected image(s) without presenting any visibly jarring jumps in the stabilized video sequence as the selected image(s) is reached during the playback of the stabilized version of the video sequence. In particular, in the calculation of the steered stabilization trajectory, each video image frame may be assigned a weighting value based, at least in part, on the proximity of the respective image's capture time to the capture time of the current image and whether or not the respective image has been designated as one that shall meet a particular stabilization constraint(s).

Examples of situations in which a user may desire one or more particular stabilization constraints to be placed upon a selected image(s) in a stabilized video sequence may include the following: 1) stabilizing towards a selected 'thumbnail' image from a sequence of captured images, e.g., so that a stabilized video sequence may be created that leads up to and 'lands on' (i.e., requires little or no stabilization motion to be stabilized) the selected thumbnail image, wherein the thumbnail image may be indicative of the content of the underlying video sequence; or 2) selecting particular image frames of a captured video sequence, e.g., in real-time as they are being captured, as 'points of interest' in the video that the user would like to steer the video stabilization trajectory towards, i.e., to ensure that such selected frames require little or no stabilization motion to be stabilized by the time they are processed by the video image stabilization algorithm.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

One approach to video stabilization that makes use of a tunable video stabilization strength parameter is to first determine what sort of activity is causing the detected camera motion, set the tuning parameter value accordingly, and stabilize in accordance with that value. For example, if no motion is detected, it may be possible to classify the "type of motion" as stationary and, as a result, apply very strict stabilization. If, on the other hand, a large amount of camera motion is detected along a single axis, it may be possible to classify the type of motion as "strolling" (i.e., akin to what would be captured if the video was being recorded while the user was walking), at which point a different video stabilization strength value may be applied. One approach to video stabilization described herein monitors the motion data of each frame, adjusting a stabilization tuning value based on that motion data and the motion data of a specified number of "future" and "past" frames. More specifically, video stabilization operations in accordance with such approaches may buffer some number of incoming video frames, delaying the production of stabilized video output frames by the time required to capture these frames. This arrangement permits a "current frame" to use both "future" and "past" motion data. This, in turn, permits stabilization motion adjustments (i.e., the movement of individual frames within their overscan region made to stabilize the frame) of a current frame in a way that accounts for the motion in future frames. This approach—or any other approach to video image stabilization—may be adapted to take into account specific stabilization constraints placed upon certain "selected" image frames in the incoming time-sequenced set of images by using the various techniques described herein. In particular, whatever weighting value is determined for a given "selected" video image frame in the time-sequenced set of images for the sake of the calculation of stabilization adjustment values may be altered, adjusted, attenuated, increased etc., before the stabilization motion value(s) for the current frame have been calculated, based on, e.g., the proximity of the respective "selected" image's capture time to the capture time of the current image and/or the particular stabilization constraint placed upon the respective "selected" image. As will be explained in further detail below, at a high level, the techniques described herein attempt to intelligently and gradually steer the trajectory of the video stabilization towards specific selected future frames, so that desired stabilization constraints may be met in a resultant stabilized video sequence, without producing any jarring visual jumps when the selected image(s) are reached during the playback of the stabilized video sequence or a subset of the stabilized video sequence comprising the selected image(s).

Figure 3A:
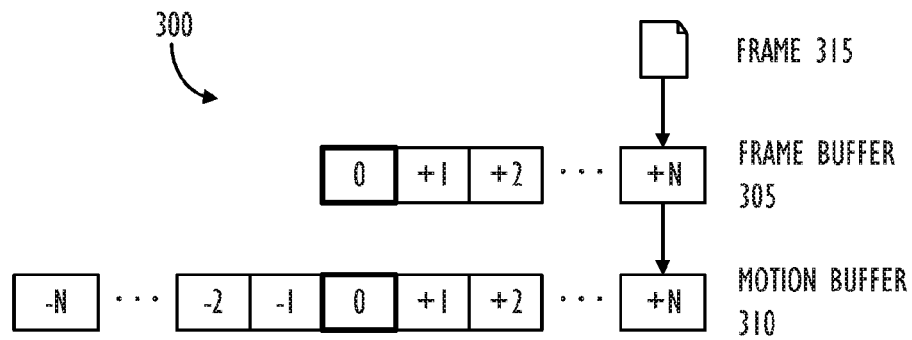
FIGS. 3A and 3B show, in block diagram form, a frame buffer system, in accordance with one embodiment.
Figure 3B:
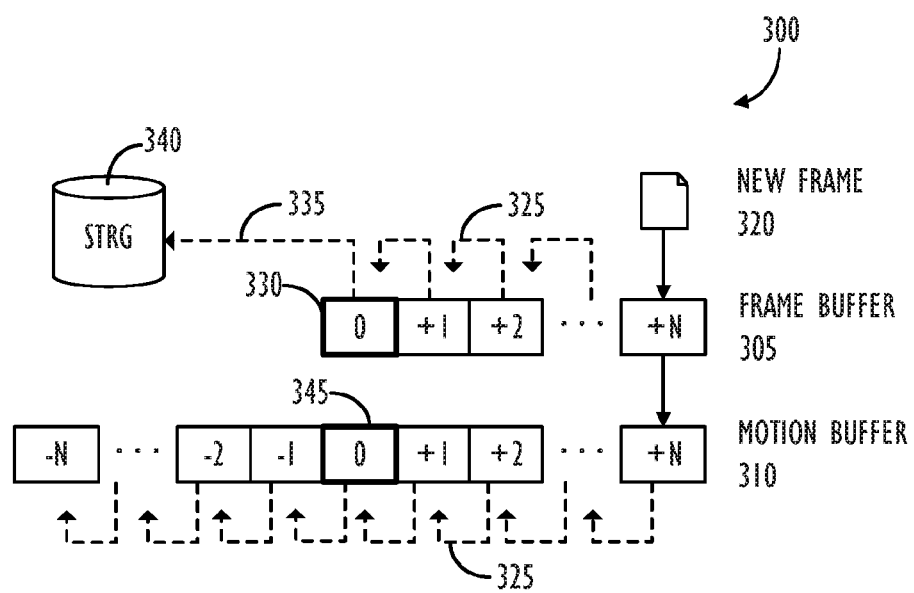

Referring to FIG. 1A, video stabilization operation 100 in accordance with one embodiment of a video image stabilization approach begins by initializing a buffer system with an incoming stream of video frames (block 102). From this stream, image data and motion data (including, e.g., image capture device motion data, image processing data from which motion information may be determined, and/or other image metadata) may be buffered for a specified number of frames before a first stabilized output frame is generated. Referring to FIG. 3A, buffer system 300 in accordance with one embodiment includes (N+1) entry frame buffer 305, and (2N+1) entry motion buffer 310. As each frame 315 arrives, it is placed into the $+N^{th}$ frame buffer entry with the frame's corresponding motion data placed into the $+N^{th}$ motion buffer entry. Frame motion data (e.g., frame metadata) may come from, for example, one or more gyroscopes and/or one or more accelerometers whose output is matched with, or synchronized to, the capture of video frames (e.g., video frame 315). Referring to FIG. 3B, as each new frame 320 arrives at buffer system 300, every entry already in frame buffer 305 and every entry in motion buffer 310 may be shifted to the left by one position as indicated by dashed lines 325. After being stabilized, frames shifted out of frame buffer entry 330 (the $0^{th}$ entry) may be routed 335 to long-term storage 340. Motion data shifted out of motion buffer entry 345 (i.e., the $-N^{th}$ entry, or, in instances where past motion data is not taking into account, the $0^{th}$ entry) may be discarded or retained. In buffer system 300, for example, motion buffer 310 includes (2N+1) total entries: N entries corresponding to frames captured before frame and motion entry 330 and 345, respectively (i.e., entries having negative indices), and N entries corresponding to frames captured after frame and motion entry 330 and 345, respectively (entries having positive indices). From the point of view of a frame in entry 330, positive-index motion entries correspond to frames captured in the "future" while negative-index entries correspond to frames captured in the "past." The difference in time between the capture of a frame placed into the $+N^{th}$ frame buffer entry and generation of a stabilized version of that frame from entry 330 may be thought of as the amount of time stabilization operation 100 looks into the "future." In one embodiment, frame buffer 305 may store a specified number of frames (e.g., 16, 24, 32, etc.). Because buffering frames can be expensive in terms of memory, e.g., one frame at 1080p video resolution can be between 2 and 3 megabytes (MB), the optimum size of frame buffer 205 may be dependent upon the available memory, the amount of delay time that is acceptable between initiation of video capture operation 100 and generation of a first stabilized output frame, and the intended use of the image capture device. (The size of motion buffer 310 may be small compared to frame buffer 305, as the only data generally stored there is camera motion data.)

Returning to FIG. 1A, once frame 305 and motion 310 buffers have been initialized in accordance with block 102, an initial video stabilization strength parameter (σ) (block 104) and a current frame may be selected (block 106). For the purposes of this disclosure, the "current frame" will be taken as that frame in frame buffer entry 330 (and motion data in motion buffer entry 345). A video stabilization strength parameter may be thought of as a value used, in part, to determine weighting values and/or weighting function used to weight the movement data of one or more other captured image frames in the video sequence in order to determine a resultant stabilization motion to be applied to the current image during stabilization operations. According to some embodiments described herein, the weighting values determined by the video stabilization strength parameter may be modified based, at least in part, on the proximity of certain "selected" images' capture times to the capture time of the current image and/or the particular stabilization constraints placed upon the respective "selected" images. For example, at blocks 108/120/126, the operation 100 may proceed to block 138 of FIG. 1D to determine whether the weighting value assigned to any particular frame in the time-sequenced set of image frames should be adjusted in any way, e.g., based on the frame's having been designated to meet a particular stabilization constraint(s).

Figure 1B:
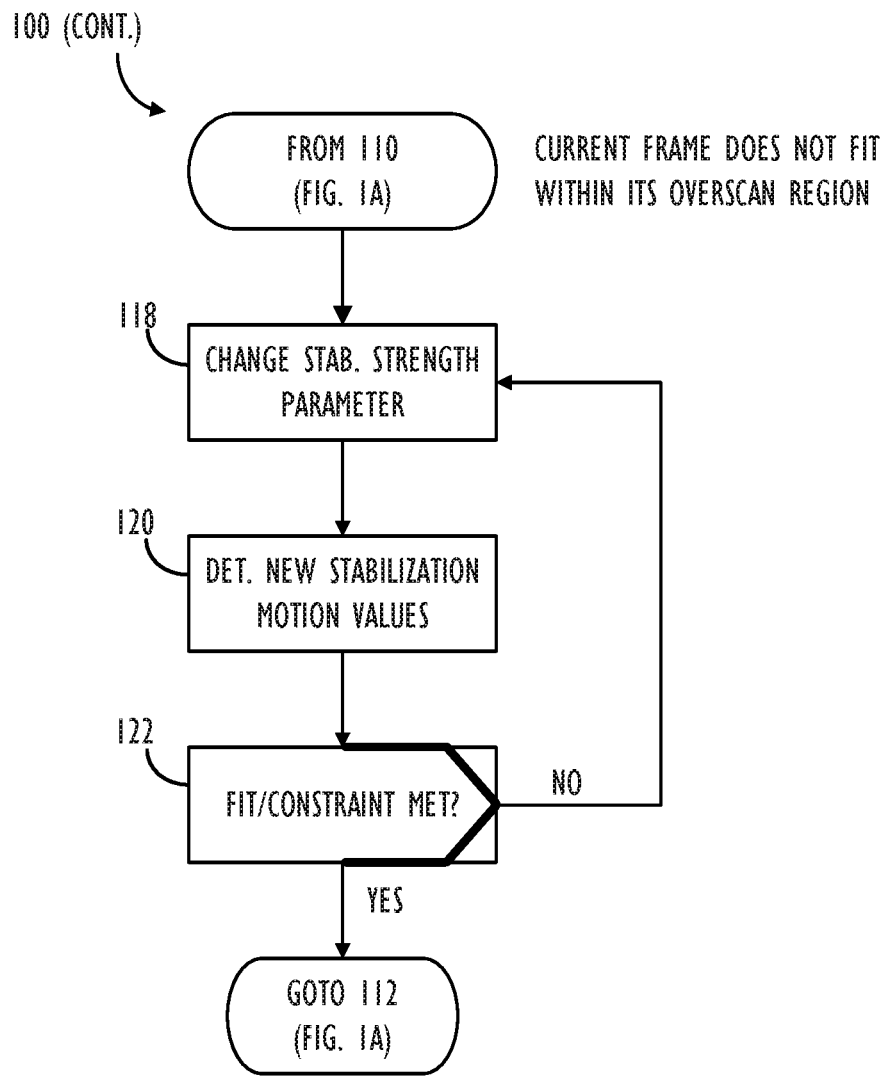
Figure 1C:
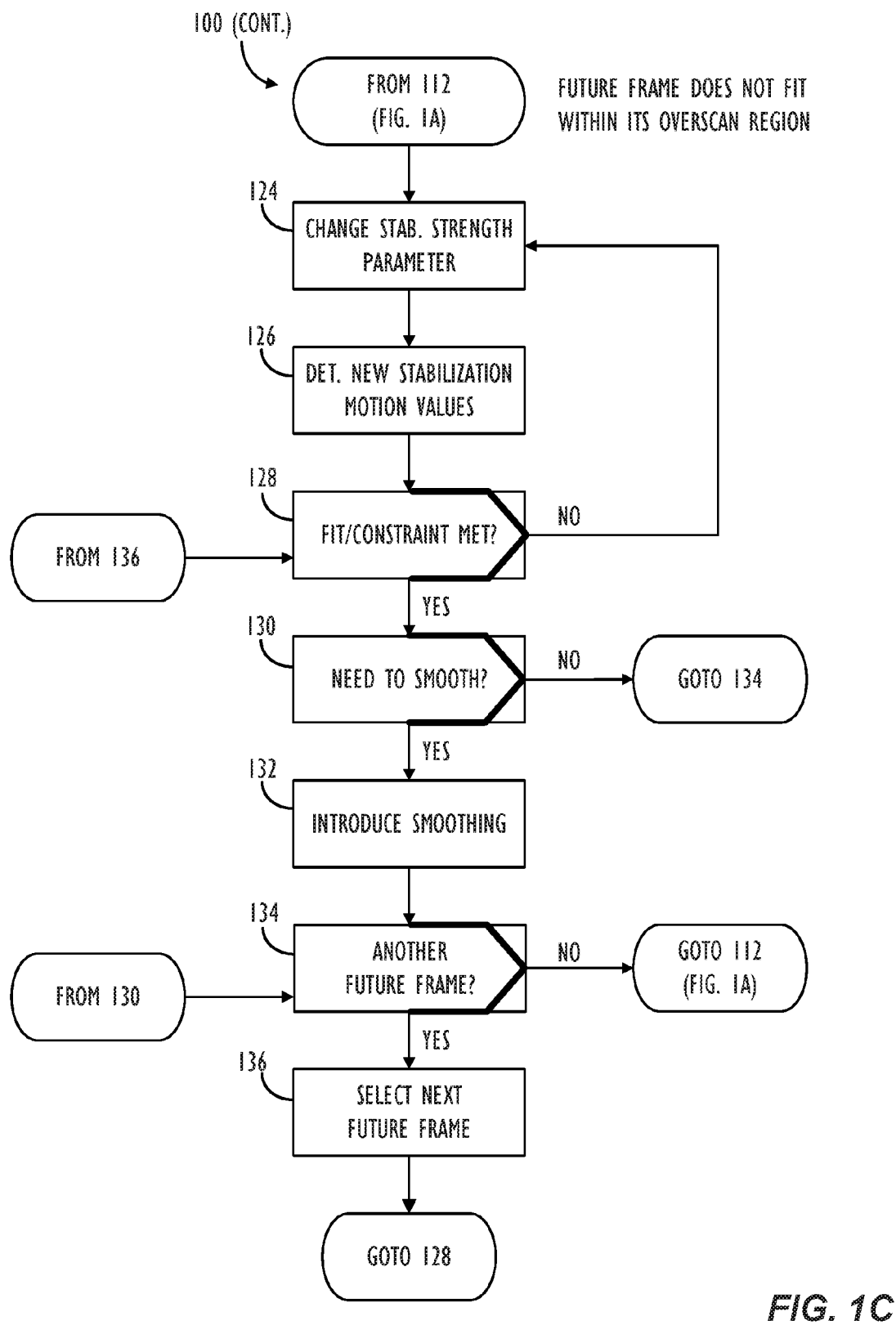
Figure 1D:
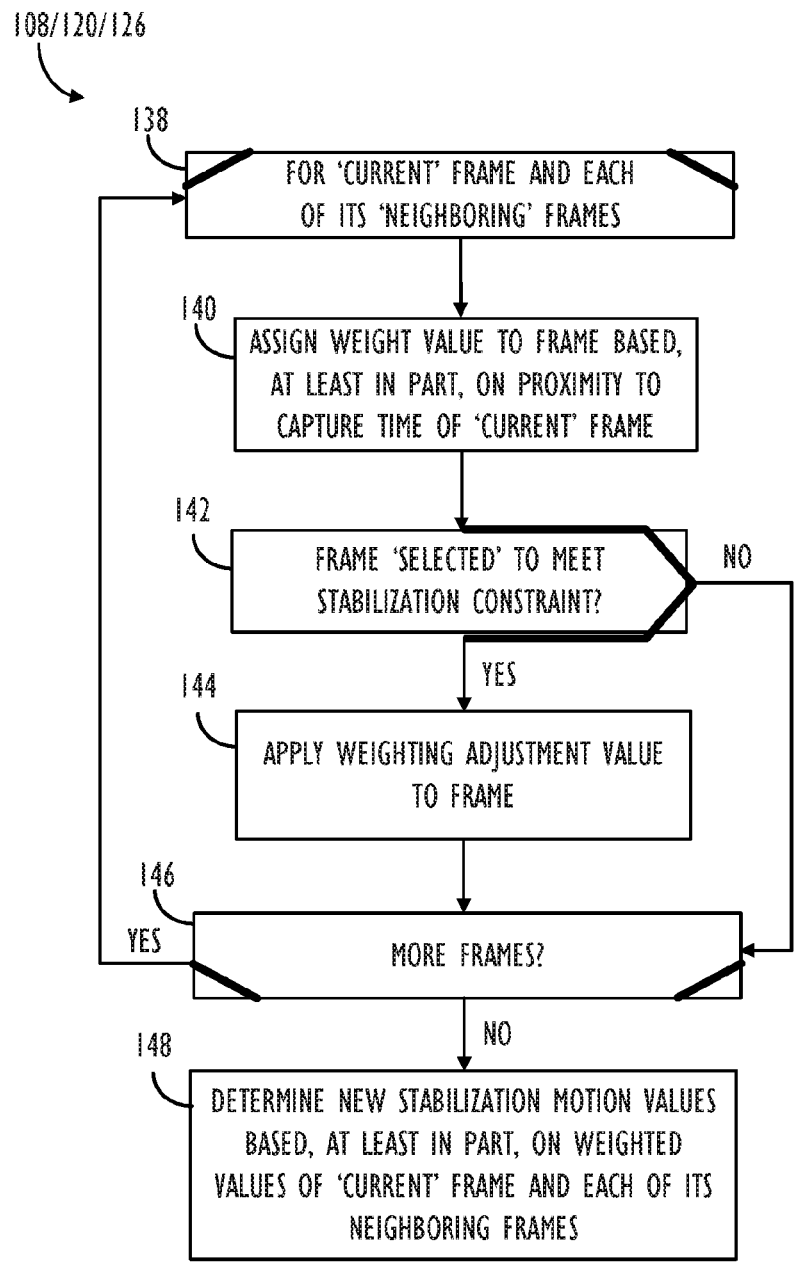

Referring now to FIG. 1D, the operation 100 may iterate over the current frame and each of its "neighboring" frames, i.e., the "past" and "future" frames, as discussed above (block 138). For each image in the time-sequenced set of images the current frame and its neighboring past and future frames), the process may assign a weight value to the frame based, at least in part, on the video stabilization strength parameter and the proximity of the frame to the capture time of the current frame (block 140). In some embodiments, determining the weighting value to be applied to a given frame may entail utilizing a normal (or Gaussian) distribution weighting function that is centered at the current frame and has a desired standard deviation value, which may, e.g., be modulated by the video stabilization strength parameter, as is described in more detail with respect to FIG. 5. The result of such a distribution being used as a weighting function is that the current frame (i.e., the "center" frame in the distribution) will have the largest weight value, and the past and future frames will have proportionally lower weight values, based on how far away in "time" they were captured from the current frame. The term "weighting value" as used herein refers to a weight that is applied to the motion data for a given frame. In other words, the more heavily a given frame is weighted, the more the stabilization process will attempt to move the 'visible frame' (i.e., the portion of the captured frame that is actually encoded into the resultant stabilized video sequence) towards that frame's position. In other words, the stabilization trajectory of the stabilized video sequence will be steered towards the position of those frames that have been assigned a higher weighting value.

According to some embodiments, there will be an additional check made (block 142) to assess whether the frame that is currently being iterated over has been selected to meet one or more particular stabilization constraints. If the answer is 'NO' at block 142, the process will proceed to block 146 to assess whether there are more frames to iterate over and, if so, return to block 138 to assign and/or adjust the weighting value of the next frame. If there are no further frames, to evaluate, the process of FIG. 1D may terminate at block 148 by returning the newly-determined stabilization motion values based, at least in part, on the weighted motion data values of the current frame and each of its neighboring frames to operation 100.

If the answer is 'YES' at block 142, the process will proceed to block 144 to apply a weighting adjustment value to the frame (e.g., an additional boost to the frame's calculated weighting value), and then proceed on to block 146 to assess whether there are more frames to iterate over and, if so, return to block 138 to assign and/or adjust the weighting value of the next frame. In some embodiments, the additional weighting adjustment value applied at block 144 may comprise a predetermined adjustment amount, e.g., a 50% increase over the weighting value that would otherwise be calculated for that image. According to other embodiments, the weighting adjustment value applied at block 144 may comprise a variable adjustment amount that is dependent upon the proximity of the respective image's capture time to the capture time of the "current image." In other words, the closer an image is getting to becoming the "current" frame, the greater amount of adjustment "boost" that may be applied to the image's weighting value. According to other embodiments, the weighting adjustment value applied at block 144 may comprise a variable adjustment amount that is dependent upon the proximity of the respective image's spatial proximity to the predicted stabilized trajectory. In other words, the closer an image is spatially to the predicted stabilized trajectory, the smaller the amount of adjustment "boost" that may be applied to the image's weighting value, which may improve the smoothness of the resultant stabilized video sequence. In still other embodiments, the magnitude of adjustment "boost" that may be applied to an image's weighting value may be based, at least in part, on motion data for the other frames currently in the image buffer (i.e., the past frames, current frame, and future frames). For example, in the case of a constant speed panning motion (where, e.g., there is a similar amount of difference in the change in motion data from frame to frame sequentially in the buffer) with a single frame selected, applying a large weight adjustment boost may hurt the stabilized trajectory, i.e., it would transform the constant speed motion into a variable speed motion as the video sequence approached the selected frame. Whereas, if it is detected that the selected frame is already close to the calculated stabilized trajectory, a considerably lower weight adjustment boost could be applied to the frame, thus doing a better job of preserving the look of constant speed motion in the stabilized video sequence as the video is stabilized according to the calculated stabilized trajectory. In still other embodiments, once an image has become a "past" image, the amount of its determined weighting adjustment boost may be diminished. For example, the weighting adjustment value applied at block 144 to a "past" image that has been selected to meet a stabilization constraint may comprise a diminished predetermined adjustment amount, e.g., only a 10% increase over the weighting value that would otherwise be calculated for that image according to the weighting function—with the additional caveat that the adjustment boost could be diminished even further as the selected image moves farther and farther into the "past." As mentioned above, once there are no further frames to evaluate, the process of FIG. 1D may terminate at block 148 by returning the newly-determined stabilization motion values based, at least in part, on the weighted motion data values of the current frame and each of its neighboring frames to operation 100 (i.e., to block 108, 120, or 126, depending on what block the execution of the operation of FIG. 1D was initiated from).

As shown in FIG. 1A block 108, FIG. 1B block 120, and FIG. 1C block 126, subsequent determinations of the video stabilization strength parameter may be modulated based on whether the determined stabilization motion values fit within the current frame's overscan region and/or whether the particular stabilization constraints have been met for the current frame (or will be able to be met for a future frame). In other words, the determined video stabilization strength parameter may be incrementally decreased (or increased) as necessary for a given frame until the determined stabilization motion for each frame fits within its respective overscan region and/or the stabilization constraints are met for the current and/or future frames.

Figure 4:
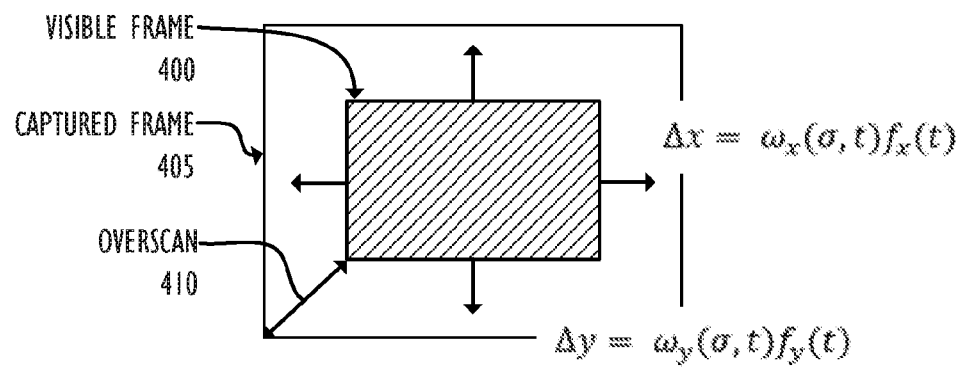
FIG. 4 illustrates the movement that can be applied to a visible region of a frame within its overscan during stabilization operations, in accordance with this disclosure.

Referring now to FIG. 4, stabilization motion values for an exemplary captured frame are shown. As discussed above, when performing video image stabilization, adjustments may be made to the location of the visible frame within each captured image frame (e.g., by pushing the visible frame into the frame's overscan region in a particular direction), in order to stabilize the image with respect to the rest of the captured video sequence. The particular adjustments made to stabilize a frame may be determined based, at least in part, on one or more weighting functions that establish a relative weight that the motion data of each frame in an incoming frame buffer may contribute to the determined adjustments of the frame that is currently being stabilized.

As shown in FIG. 4, the stabilization motion of visible frame 400 within captured frame 405 (the difference being overscan 410) is shown with the following functions:

$$\Delta x = \omega_x(\sigma, t) f_x(t) \quad \text{EQ. 1A}$$

and $$\Delta y = \omega_y(\sigma,t) f_y(t) \qquad \text{EQ. 1B,}$$

where: $\Delta x$ and $\Delta y$ represent the amount of motion along x and y coordinate axes that the current frame should be moved in accordance with stabilization operation 100; $\omega_x()$ and $\omega_y()$ represent x and y coordinate weighting functions respectively; and functions $f_x()$ and $f_y()$ represent arbitrary movement functions (linear or non-linear) that are up to the discretion of the designer. It should be understood that, while EQS. 1A and 1B describe translation only, actual correction may include other axes and correction for other artifacts caused by device instability during video capture operations. For example, in one embodiment, video may be stabilized using gyroscope output (represented as quaternions) against rotation, perspective distortion, and rolling shutter artifacts. In addition, multiple corrections to an image at various positions of the image's plane may be made—rather than a single or global correction, as described here. In short, for each current frame, video stabilization operation 100 may determine the stabilized motion trajectory based on past/future motion data, and may determine the correction (difference) that needs to be applied to the frame (e.g., based the frame's respective motion data) to make it equal the stabilized trajectory. Using this information and known camera and lens characteristics (e.g., focus), the video stabilization operation 100 may then generate multiple perspective transforms (e.g., translation, rotation, etc.), which may then be applied to the image. (The size of overscan 410 has been grossly overstated in FIG. 4 for illustrative purposes. Typical sizes for overscan 410 may be between 3% to 10% of a captured frame's horizontal and vertical extents, respectively.) In general, a video stabilization strength parameter, $\sigma$, may vary from image to image and, as a result, weighting values $\omega_x()$ and $\omega_y()$ may also vary from image to image within a given frame buffer.

Figure 5:
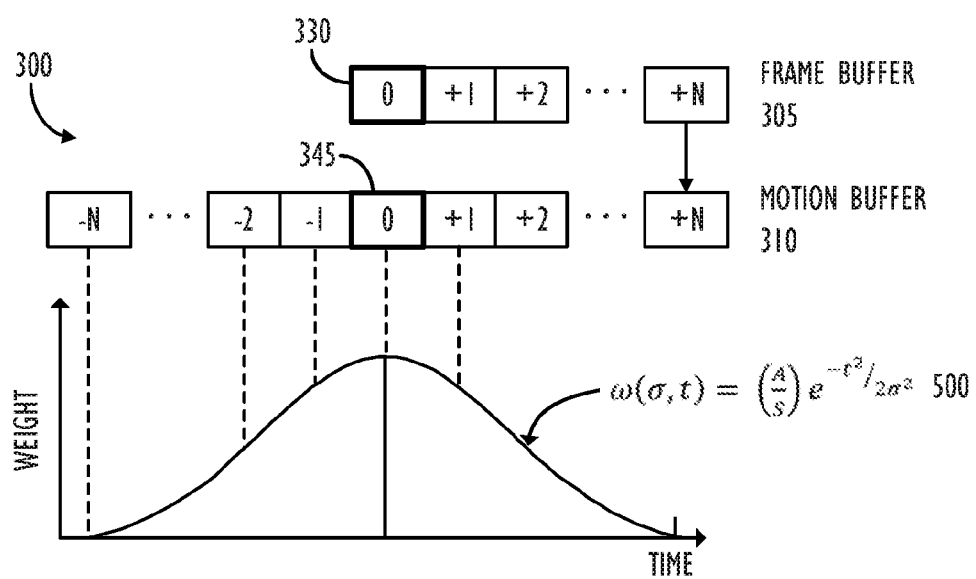
FIG. 5 illustrates a stabilization weighting function, in accordance with one embodiment.

Referring to FIG. 5, in one embodiment, video stabilization strength parameter $\sigma$ may be the standard deviation of a Gaussian weighting function 500 (500 could represent either, or both, $\omega_x()$ and $\omega_y()$ of EQS. 1A and 1B). As shown in illustrative weighting function 500, time may correspond to the buffered motion data's index, i.e., ranging from positive N in the "future" direction to negative N in the "past" direction. By way of example, the weight value assigned to the "current image" buffer entry (i.e., time=0, buffer entries 330 and 345) would be the maximum value of function 500.

Returning again to FIG. 1A, once buffer system 300 is initialized, the current frame's initial stabilization motion (e.g., as provided by EQS. 1A and 1B) may be determined (block 108). For a given video stabilization strength parameter $\sigma$ (as optionally modified by any additional weighting values applied to the current frame, per the discussion with reference to FIG. 1D), a frame's $\Delta x$ and $\Delta y$ values are simply functions of time (e.g., motion buffer entry index) as follows:

$$\Delta x = K_x \Sigma_{t=-(N-1)}^{(N-1)} \omega_x(\sigma,t) f_x(t), \qquad \text{EQ. 2A}$$

and $$\Delta y = K_y \Sigma_{t=-(N-1)}^{(N-1)} \omega_y(\sigma,t) f_y(t), \qquad \text{EQ. 2B,}$$

where $K_x$ and $K_y$ are constants based on, in part, the current video stabilization strength parameter value, $\omega_x()$ and $\omega_y()$ may be weighting equations, e.g., having a form as shown in FIG. 5, and $f_x(t)$ and $f_y(t)$ are as described above. Based on results given by EQS. 2A and 2B, a test may be made to determine if the current frame remains within its overscan and/or if any particular stabilization constraints for the frame have been met and, if so the "YES" prong of block 110), another test may be made to determine if the buffer's future entries also fit and/or meet their stabilization constraints (block 112). If too large a number—or even all—of the future entries are designated as having stabilization constraints, each future frame may end up simply being constrained to its unstabilized position, i.e., the stabilization strength may end up being lowered to the minimum value, essentially resulting in an unstabilized video sequence. As mentioned above, the stabilization constraint that is selected for a particular frame may, e.g., require that the stabilized frame lines up with the unstabilized frame within a maximum allowed displacement (e.g., within 4 pixels in any direction). In some embodiments, this constraint may be applied only to a particular portion of the frame, e.g., a box drawn over a central region of the frame may only be allowed a maximum displacement. In other embodiments, the maximum displacement may be defined in terms of a percentage of the overscan region (e.g., 0.5% of the overscan region), rather than in terms of a number of pixels. In still other embodiments, the stabilization constraint may be defined in terms of a maximum amount of perspective change, rotation change, and/or translation change allowable between the stabilized and unstabilized version of the frames (e.g., if stabilization is being performed taking all three dimensions into account). The use of additional constraints would generally yield lower video stabilization strength parameter values, thus presenting a tradeoff between overall stabilization strength of the stabilized video sequence and how ell the "selected" frames will line up with their unstabilized counterparts.

A positive response to block 110 means the current frame has been determined to fit within its overscan and meet any selected stabilization constraints. The remaining actions of operation 100 seek to predict if the current frame's future frames will fit in their overscan using the same strength parameter and/or meet their respective stabilization constraints. As long as the current video stabilization strength parameter value is found to do this, that value is used. When one of the current frame's future frames does not fit in its overscan and/or meet its stabilization constraint(s), the video stabilization strength parameter value may be lowered until a value is found that predicts it will fit. (See discussion below regarding blocks 124-136). In some embodiments, when a future frame is found that necessitates a change in the stabilization strength value (e.g., due either to a particular stabilization constraint that needs to be met or projected movement outside the overscan region), the operation may proceed by beginning to adjust the stabilization strength value downward (or upward) for the current frame and each successive frame, so that, when the future frame necessitating the change in stabilization strength values becomes the "current frame," the stabilization strength value will have gradually and smoothly reached its new target value, thus avoiding any abrupt or jarring changes in the stabilization strength value or the resulting stabilized video.

If the current frame's future frames also fit within their overscan and/or meet their respective stabilization constraints (i.e., the "YES" prong of block 112), the current frame may be updated to account for the determined $\Delta x$ and $\Delta y$ stabilization motion values, and then both frame and motion data may be shifted by one position in the buffer (block 114). As part of the shift process, the current frame may be transferred to storage 340. In one embodiment, the current frame's data may be altered in accordance with calculated $\Delta x$ and $\Delta y$ stabilization motion values prior to shift and store operations at block 114. In another embodiment, frame metadata may be altered instead. As used here, the term "frame data" refers to image data (e.g., R, G, and B values), whereas the term "frame metadata" or "metadata" refers to any information incorporated into a video/image frame that is not image data, such as motion data, f-stop, focal length, white balance, gains, geo-local data, etc. If additional frames remain to be processed (i.e., the "YES" prong of block 116), stabilization operation 100 continues at block 106.

If the current frame's calculated stabilization motion values Δx and Δy do not permit the visible portion of the current frame to remain within its overscan (the "NO" prong of block 110), stabilization operation 100 continues at block 118 in FIG. 1B. Initially, the video stabilization strength parameter σ may be changed by some amount (as optionally modified by any additional adjusted weighting values applied to the current frame, per the discussion with reference to FIG. 1D) (block 118). For example, video stabilization strength parameter σ may be reduced in fixed steps of 0.1. In another embodiment, video stabilization strength parameter σ may be reduced by a specified percentage of the current value, for example, 10%. When using the exemplary weighting equation shown in FIG. 5, i.e., $$\omega(\sigma, t) = \left(\frac{A}{S}\right) e^{-t^2/2\sigma^2},$$

decreasing the value of σ has the effect of reducing the spread of the Gaussian weighting function. This, in turn, attributes a more weight/significance to those entries closer to the current frame with respect to a weighting function having a larger σ value. Based on the new stabilization strength value, EQS. 2A and 2B may be used to determine Δx and Δy stabilization motion values (block 120). If the new adjustments still do not permit the current frame to fit within its overscan and/or meet its stabilization constraint(s) (i.e., the "NO" prong of block 122), operation 100 continues at block 118, where actions 118-122 may be repeated until a video stabilization strength parameter value σ is found that permits the current frame to stay within its overscan and/or meet its stabilization constraint(s). If, after calculating stabilization motion values in accordance with block 120, the current frame fits within its overscan (the "YES" prong of block 122), operation 100 continues at block 112 in FIG. 1A.

Returning to FIG. 1A, if the current frame's future frames are determined not to fit within their overscan (and/or meet their respective stabilization constraint(s)) for the given video stabilization strength parameter value (i.e., the "NO" prong of block 112), operation 100 continues at block 124 in FIG. 1C. In general, blocks 124-128 perform as do blocks 118-122. If a future frame is amenable to a higher stabilization strength than its immediately prior frame, actions in accordance with block 124 may increase the video stabilization strength parameter's value (as optionally modified by any additional weighting values applied to the respective frame, per the discussion with reference to FIG. 1D). In general, it has been found advantageous to set a frame's video stabilization strength parameter value to as high a value as possible, while still respecting the frame's overscan boundary. If, after having its video stabilization strength parameter value adjusted, a frame fits within its overscan and/or meets its stabilization constraint(s) (i.e., the "YES" prong of block 128), another check may be made to determine if its value is such that it may be beneficial to smooth the transition between itself and prior frames (block 130).

Figure 7A:
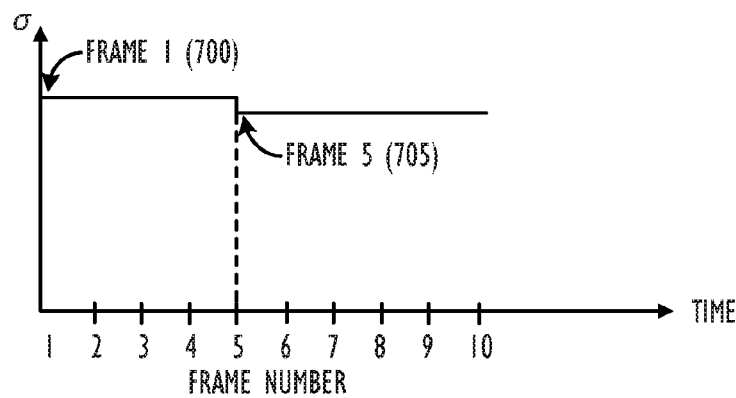
FIGS. 7A and 7B illustrate the use of a smoothing trajectory, in accordance with one embodiment.
Figure 7B:
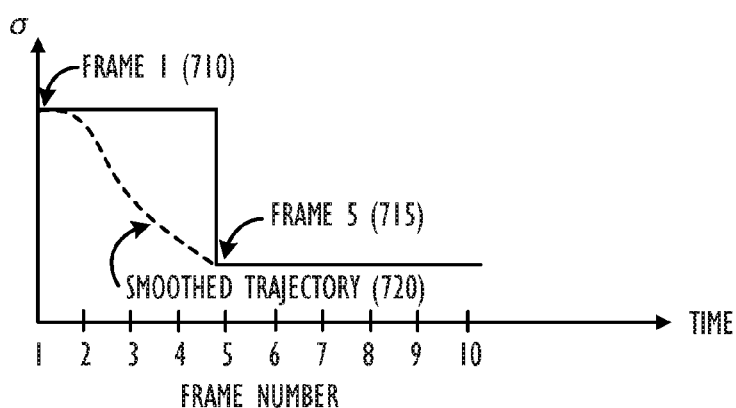

Referring now to FIGS. 7A and 7B, the effects of smoothing the transition between video stabilization strength parameters is illustrated. For example, as shown in FIG. 7A, if the stabilization strength difference between two particular frames (e.g., frame 1 (700) and frame 5 (705)) is small (i.e., the "NO" prong of block 130), no smoothing of the stabilization strength value, σ, may need take place. As shown in FIG. 7A, the stabilization strength value, σ, may simply (in this case) lower to its new value at the time that frame 5 (705) is stabilized.

If, instead, as shown in FIG. 7B, the stabilization strength difference between two particular frames (e.g., frame 1 (710) and frame 5 (715)) is large or greater than some threshold, e.g., a value that may change based on a given implementation (i.e., the "YES" prong of block 130), a smoothing trajectory of the video stabilization strength parameter, σ, such as trajectory 720, may be employed (block 132). As shown in FIG. 7B, the smoothed trajectory 720 allows the video stabilization strength parameter value, σ, to lower the desired strength value for frame 5 gradually during the stabilization of frames 2, 3, and 4—so that it reaches the desired stabilization strength value at the time that frame 5 (715) is stabilized—without any large jumps in stabilization strength. It is noted that the shape of stabilization strength value smoothing trajectory 720 is only illustrative. The actual shape may be anything that meets the needs and goals of the image capture system. For example, in another embodiment, video stabilization strength parameter smoothing trajectory 720 could be linear, or could start at a frame other than that shown (e.g., toward the abrupt transition). (It should be understood that the "trajectory" of the video stabilization strength parameter σ as described here is a stand-in for the smoothed/stabilized trajectory of the image capture device. One of ordinary skill in the art will understand they are not the same. In general, the higher the value of the video stabilization strength parameter, σ, the smoother the trajectory of the stabilized video sequence will be.) As will be discussed in more detail, operation 100's ability to look into the "future" provides it with the ability to anticipate abrupt movements in the future and begin adjusting the strength value of images before the abruptness occurs so that visible jumps or glitches in the final video sequence may be reduced or eliminated. Next, a check may be made to determine if the current frame (from FIGS. 1A and 1B) has any more future frames (block 134). If additional future frames exist (i.e., the "YES" prong of block 134), the next future frame is selected (block 136) and operation 100 may continue at block 128. If there are no further future frames to evaluate (i.e., the "NO" prong of block 134), operation 100 continues at block 112 in FIG. 1A. Returning once more to FIG. 1A, after the current frame has been updated in accordance with stabilization operation 100 and shifted into storage (block 114), if there are no more frames to evaluate (i.e., the "NO" prong of block 116), stabilization operation 100 is complete. If there are more frames to evaluate (i.e., the "YES" prong of block 116), operation 100 may return to block 106 to obtain the next "current" frame for stabilization.

Figure 8:
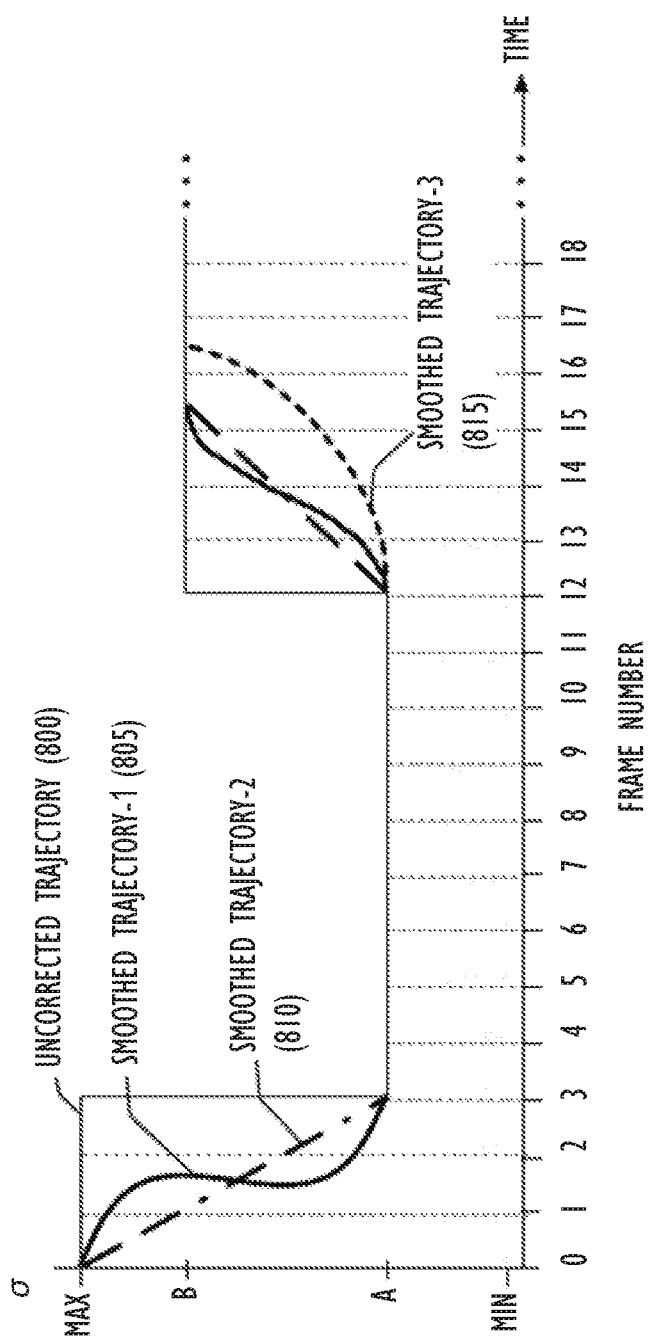
FIG. 8 shows illustrative stabilization strength trajectories, in accordance with one embodiment.

To see how the smoothing (block 132) of stabilization operation 100 may be applied, consider FIG. 8. Uncorrected trajectory 800 represents the change in the video stabilization strength parameter value needed to stabilize a video stream without the benefit of video stabilization methods in accordance with this disclosure. The abrupt changes in stabilization strength at t=3 and 12 (e.g., necessitated by motion of the image capture device as reflected in gyroscope motion metadata associated with the incoming frames) may cause a visual flicker, jump, or other discontinuity during video stream playback. As will be discussed in more detail below, each of smooth trajectory 1 805 and smooth trajectory 2 810 represent but two possible smoothed trajectories that may be provided in accordance with operation 100.

At t=0 an initial video stabilization strength parameter value equal to MAX is found to adequately adjust the current frame (see 102-110). In one embodiment, each frame's initial stabilization strength parameter value may be set equal to a maximum value, MAX. In another embodiment, each frame's initial stabilization strength parameter value may be set equal to a minimum value, MIN. In yet another embodiment, each frame's initial stabilization strength parameter value may be set equal to that of its immediate "past" frame. Following evaluation of the current frame, each of the current frame's buffered "future" frames may be tested to determine what video stabilization strength parameter value they may need to remain stabilized (see 112) (as optionally modified by any weighting adjustment values applied to the frame, per the discussion with reference to FIG. 1D). This process repeats for each successive future frame until, at t=3, the frame's video stabilization strength parameter value must be reduced to A in order to remain within the overscan limit and/or meet that frame's stabilization constraint(s) (see 124-128). Once this is determined, stabilization operation 100 may select any acceptable smoothing function to get from a stabilization strength parameter value of MAX at t=0 to a stabilization strength parameter value of A at t=3 (see 130-132). In one embodiment, a smoothing function may be chosen such that the smoothed trajectory takes on a sigmoidal shape, as in smoothed trajectory-1 805. In another embodiment, a smoothing function may be chosen such that the smoothed trajectory takes on a linear shape, as in smoothed trajectory-2 810. In practice, any smoothing function that changes the stabilization strength parameter's value over time so as to result in a smoothened frame-to-frame adjustment of video images that meets the needs or goals of the system under design may be used, e.g., a linear function, an exponential function, a parabolic function, a quadratic function, a stair step function, etc. As shown in FIG. 8, the stabilization strength parameter values previously calculated for buffered frames at t=1 and t=2 may be changed, so as to accommodate the stabilization strength needed in one or more "future" frames in the buffer, e.g., based on the amount of device motion and/or stabilization constraints placed upon such "future" frames. Once a smoothed trajectory has been selected and a stabilization weight determined at t=3, evaluation of the current frame's future buffer continues (see 106-112) until, e.g., at t=12 when another abrupt change is detected (e.g., indicative of the image capture device ceasing to be moved abruptly), device motion and/or stabilization constraints for such future frames may be evaluated to see if there is a new stabilization strength value that the operation needs to begin moving towards. While the operation of generating smoothed trajectories 805 and 810 at t=12 is similar to that discussed above, increasing the stabilization strength can require the consideration of additional factors. First, a change in a stabilization strength parameter's value from 1 to 2 represents a much larger percentage change than a change from 10 to 9 (or, conversely, from 9 to 10). To address this issue, it has been found to be beneficial to increase the stabilization strength parameter slowly, resulting in a more gradually corrected trajectory, such as shown in smoothed trajectory-3 815. While virtually any function may be used to adjust the stabilization strength parameter's value over time, smoothed trajectory 815 reflects a percentage-increase regime, where each increment in the stabilization strength parameter's value is a specified percentage of the prior value. By way of example, if the percentage-increase quota is 10%, and the value of the stabilization strength parameter for the current frame is 1, the next value would be 1.1. If the current value is 10, the next value would be 11. It is noted, a falling stabilization strength parameter value is more difficult to accommodate than a rising value. When ramping the stabilization strength parameter's value down, a value certain must be reached within a given window to avoid creating a visual aberration. When ramping up, one has more flexibility in selecting the regime, as all stabilization strength parameter values below may actually fit within the frame's overscan, assuming there are not any selected frames in the future frame buffer. Further, in an increasing stabilization strength situation, it may be beneficial to increase the stabilization strength parameter to its maximum value or until it is just high enough where the current frame will not fit within its overscan; after which, the stabilization strength parameter value may be decreased to that value which just permitted the frame to fit. Finally, after a current frame (see 106-110 and 118-122) and its future frames (see 112 and 130-136) have been evaluated and stabilization strength parameters modified as necessary, the current frame's image data (or metadata) may be updated in accordance with EQS. 2A and 2B (at this point, σ will be a fixed value) to reflect the determined stabilization motions. Then, the current frame may be shifted out of the buffer system (e.g., buffer system 300) and stored (e.g., in storage 340), and each entry in frame buffer (e.g., frame buffer 305) and motion buffer (e.g., motion buffer 310) may be shifted (see block 114) to make room for a new frame (e.g., new frame 320). Following shift and store (see block 114), each successive video frame may be evaluated (e.g., via block 116) until all frames in the current frame buffer 305 have been evaluated and stabilized (e.g., using motion data in motion buffer 310).

Referring now to FIGS. 6A-6D, the effects on a stabilization weighting function of specifying weighting adjustment values to be applied to selected images are illustrated, in accordance with one or more embodiments. First, looking at FIG. 6A, an unadjusted weighting function 601 is shown that follows a normal (i.e., Gaussian) distribution pattern. Time is shown across the horizontal axis of the weighting function, as represented by the frame buffer indexes ranging from −15 to +15, with index 0 representing the "current" frame. The weight value is shown across the vertical axis of the weighting function. Because weighting function 601 follows a normal distribution, the maximum weight value occurs at the center frame, i.e., the "current" frame, which is at index t=0 in the frame buffer. Weighting function 601 drops off as the frames get farther and farther away (in either direction) from the current frame, meaning that frames that have capture times that are more temporally distant from the capture time of the current frame will have less of an influence on the stabilization trajectory of the stabilized video sequence, and, thus, it is unlikely that the stabilization strength parameter will need to be modified based on the motion information of any one single frame far into the future (or past), unless, of course, the movement in that frame is very extreme and/or it has a particularly onerous stabilization constraint that must be met.

Figure 6A:
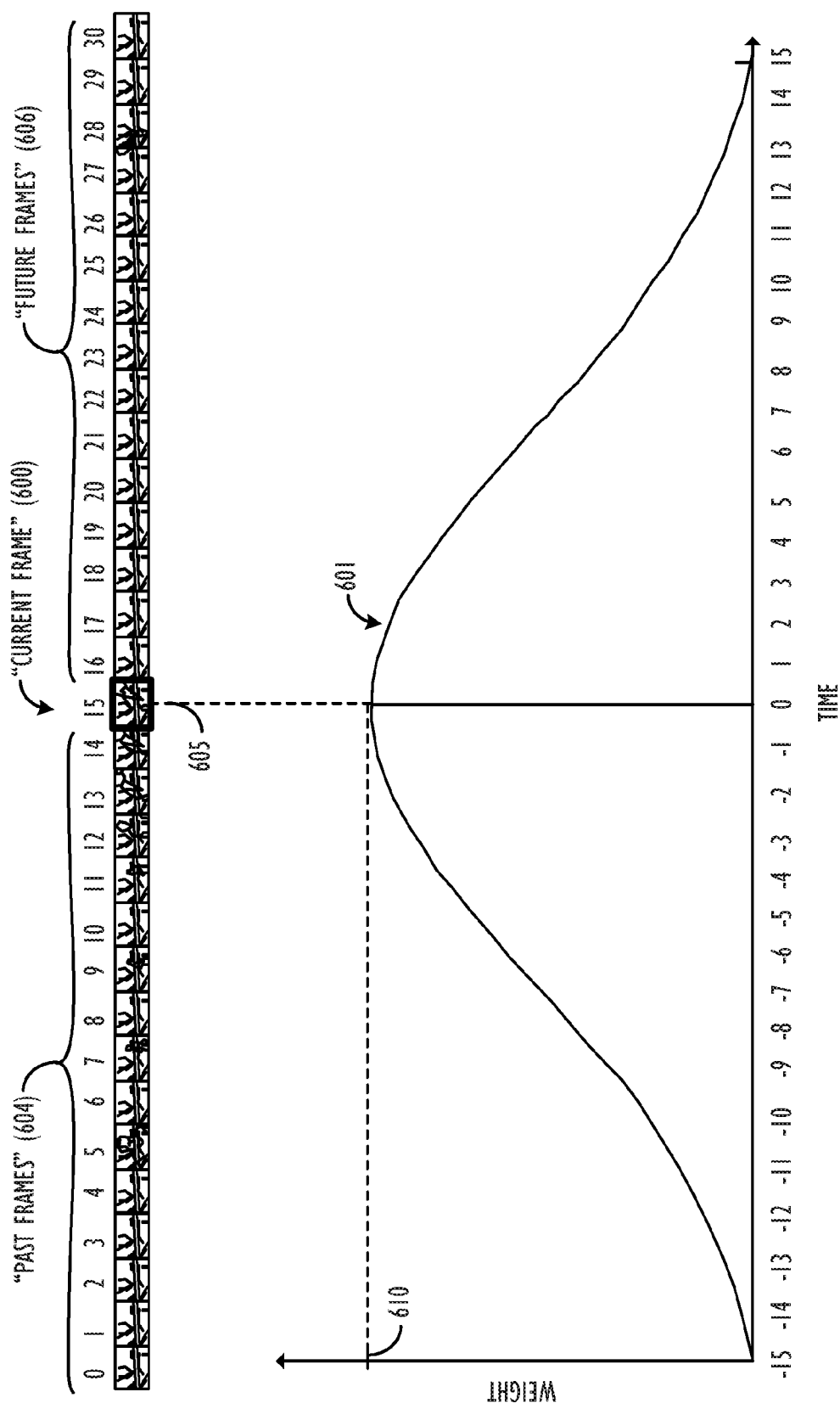
FIGS. 6A-6D illustrate the effects of adjusted weighting values for selected images on a stabilization weighting function, in accordance with one or more embodiments.

As shown in FIG. 6A, the "current frame" 600 is frame #15, i.e., the sixteenth that has been captured in the sequence (since this example starts with frame #0), the "past frames" 604 comprise frames #0-#14 that were captured by the image capture device, and the "future frames" 606 comprise frames #16-#30 that were captured by the image capture device. Dashed line 605 dropping down from current frame 600 indicates where on the weighting function 601 the weight value for current frame 600 will be taken from. In this example, the maximum weight 610 will be applied to the current frame 600. In some embodiments, the maximum weight may be normalized to a value of 1.0. In other embodiments, the area under the entire weighting function curve may be normalized to a value of 1.0. As may now be more fully understood, the stabilization motion for the current frame, i.e., frame #15 in the example of FIG. 6A, may be calculated by taking the particular frame motion for each of the 31 frames shown in the ring buffer (i.e., 15 past frames, the current frame, and the 15 future frames) and multiplying it by its respective weighting factor, as determined from weighting function 601. Assuming the calculated movement fits within the overscan region of the current frame 600, the stabilization motion may be applied to the current frame, and then all frames may be shifted one position to the left, with a new frame, frame #31 in this example, coming into the buffer at the t=+15 position and frame #0 being pushed out of the ring buffer at the leftmost end (i.e., at the t=−15 position).

Figure 6B:
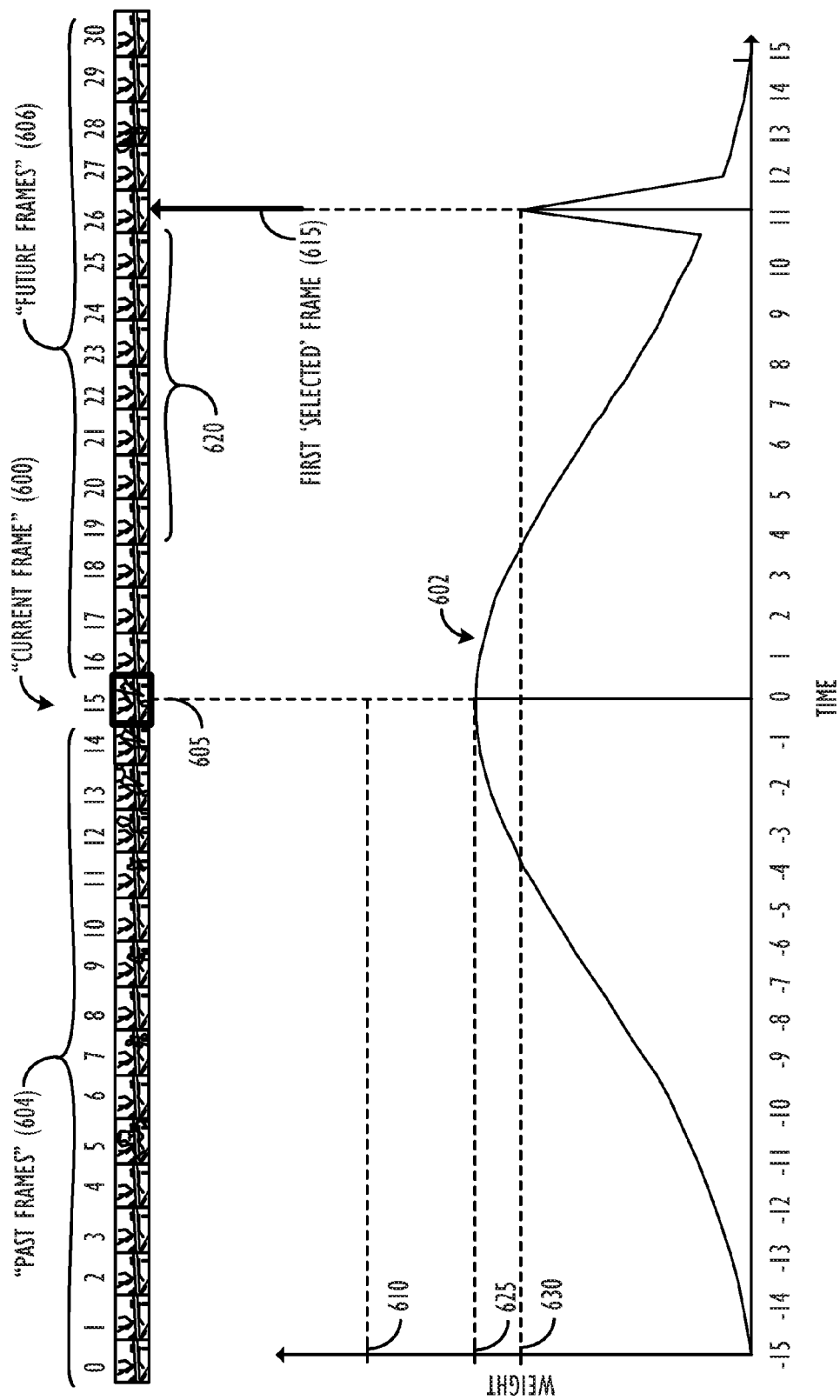

Turning now to FIG. 6B, an adjusted weighting function 602 is shown that represents an adjustment to the normal (i.e., Gaussian) distribution pattern shown in weighting function 601 of FIG. 6A. In particular, in the example of FIG. 6B, captured frame #26, which presently occupies position t=+11 in the frame ring buffer, has been designated as a first "selected" frame 615, i.e., a frame for which a particular stabilization constraint is to be met. For the sake of this example, we will assume that the stabilization constraint is that the "central" portion of captured frame #26 (e.g., comprising a box spanning the central 50% of the image's height and width) should be moved by no more than 4 pixels in any direction when it is stabilized, i.e., when it moves into the t=0 position (also referred to herein as the "current" frame position) in the frame ring buffer.

In this example, to aid in this constraint being met by the time frame #26 moves into the "current" (i.e., t=0) frame position in the frame ring buffer, the first "selected" frame 615 is given a substantial "boost" in its weighting value 630, as evidenced by the sharp peak at position t=+11 in FIG. 6B. In some embodiments, the magnitude of the boost applied to a selected frame may also be directly proportional to how close the selected frame is to being the current frame, i.e., the closer the selected frame is to position t=0, the greater the boost is that will be applied to the weight for the selected frame. By boosting the influence of the position of the first "selected" frame 615 (i.e., frame #26) in the calculation of the overall stabilization trajectory, the trajectory will be steered towards the position of frame #26. This will aid in meeting the stabilization constraint that was placed on frame #26, i.e., that very little stabilization motion will be needed to stabilize frame #26 by the time it makes it into the current t=0) position in the frame ring buffer, since the stabilization trajectory has been intentionally steered towards frame #26 for a number of preceding frames equal to the number of the future frames in the ring buffer (in this case, 15 frames). In certain embodiments, the boost applied to the selected frames may be greatly diminished as soon as a selected frame moves into the "past." In other words, once frame #26 moves into position t=−1 in the frame ring buffer, the boost to its weighting value may be downscaled using a Gaussian-like function based, at least in part, on its proximity to the current frame. In some embodiments, e.g., embodiments wherein the area under the weighting function curve is normalized to a particular value, applying the weighting adjustment boost to one or more selected frames may have the effect of lowering the peak weighting value assigned to the current frame, as shown in FIG. 6B by the lowering of the weight value for the current (i.e., t=0) from the value of 610 in FIG. 6A to the lower value of 625 in FIG. 6B.

In some embodiments, an implementation may produce a small video sequence of frames leading up to (and including) the selected frame. In the example of FIG. 6B, this is indicated by the bracket 620 surrounding the seven frames leading up to selected frame #26 (615). The number of frames being seven in this example is purely exemplary, and a larger or smaller number of frames may be chosen for a given implementation. In some such embodiments, the "selected" frame may serve as a "thumbnail" image, possibly representative of the underlying video content. As a "preview" or upon user selection of the thumbnail selected image, a video playback application may play the frames 620 leading up to the selected frame to give the viewer a sense of the underlying video content leading up to the capture of the selected frame, and it would be desirable for there to not be any visually jarring jumps between the playing of the last frame of the "lead-up" or "preview" frames 620 and the actual selected frame 615. The stabilization constraints, in addition to the weighting value boost described herein may be used to ensure that the preview video clip "lands" either directly on the selected image frame, or at least within the maximum allowed displacement (e.g., in terms of a number of pixels) of the selected image frame. In other embodiments, the "selected" frame might also come from another imaging source (e.g., a different camera or the same camera operating in a different capture mode). In such cases, the "selected" frame itself may not actually be in the stabilized video sequence, and the most similar or temporally-close frame in the video sequence may be used to determine where to pull the "preview" frames out of the video sequence from. In other embodiments, the position/motion data of the "selected" frame could be obtained (e.g., from the image capture device and/or image metadata), and the stabilization operation could force the frame in the video sequence to be at the obtained position.

In still other embodiments, rather than (or, in addition to) producing a preview sequence of video frames leading up to a stabilized selected frame, a user may simply wish to designate certain moments (i.e., frames) in the captured video sequence as 'points of interest' towards which the user desires that the stabilization trajectory of the video sequence be steered, such that the resultant stabilized video sequence is particularly stable at and around the designated point of interest frames in the video sequence.

Figure 6C:
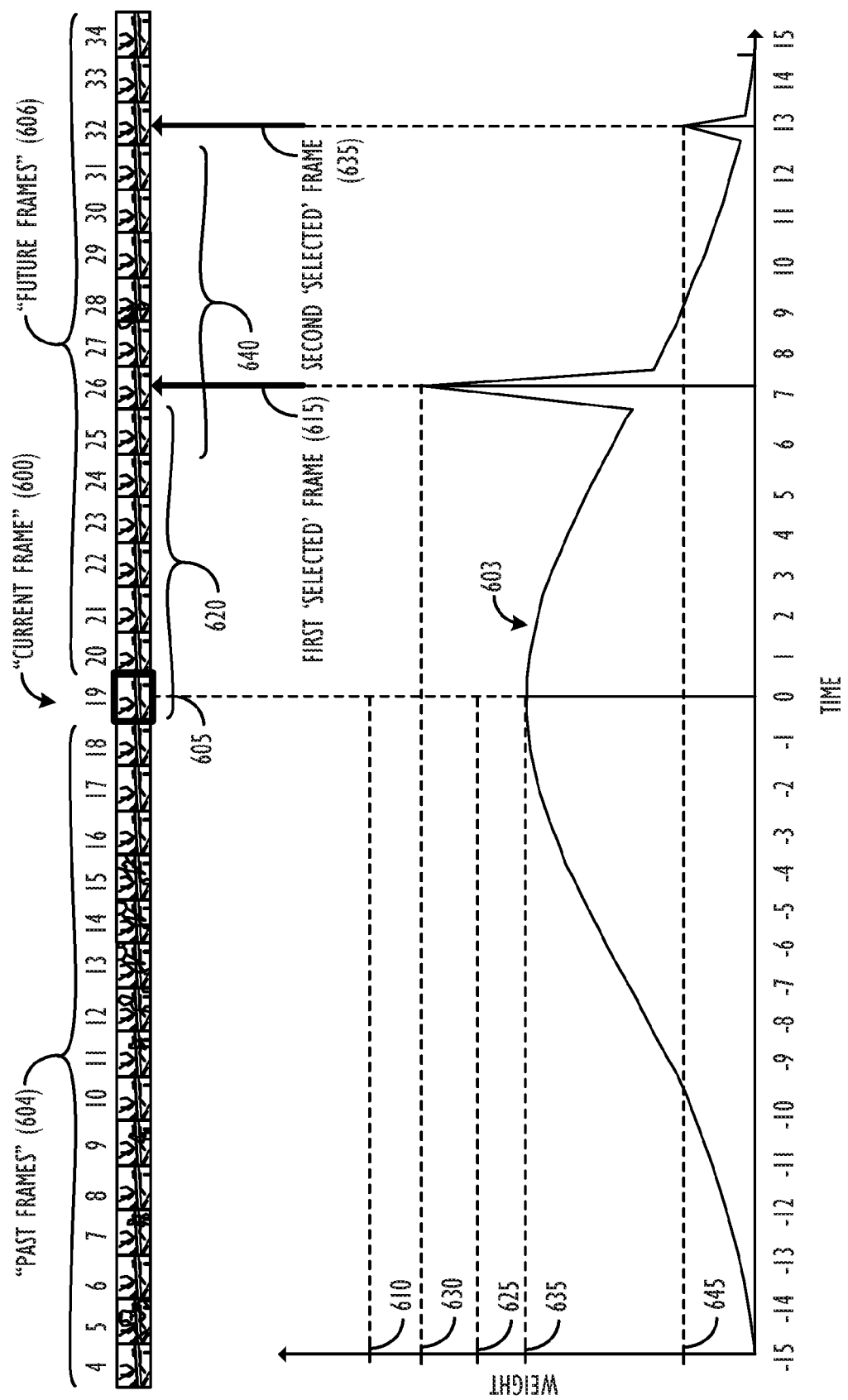

Turning now to FIG. 6C, an adjusted weighting function 603 is shown that represents a further adjustment to the adjusted normal (i.e., Gaussian) distribution pattern shown in weighting function 602 of FIG. 6B. In particular, in the example of FIG. 6C, captured frame #26, which was previously designated as the first "selected" frame 615, i.e., a frame for which a particular stabilization constraint is to be met, has moved into position t=+7 in the frame ring buffer. In other words, four captured frames' worth of time have passed between the scenario represented in FIG. 6B and the scenario represented in FIG. 6C (as indicated by new frames #31-#34 entering the frame ring buffer, and old frames #0-#3 dropping out of the leftmost end of the frame ring buffer). In this example, in the four captured frames' worth of time have that have passed since the scenario represented in FIG. 6B, a second selected frame 635 (i.e., frame #32), which now sits in position t=+13 in the frame ring buffer, has also been designated as a selected frame. Thus, FIG. 6C depicts a scenario wherein there are more than one selected frame presently within the future frames of the frame ring buffer. As mentioned above, the weighting adjustment value or 'boost' applied to second selected frame 635 may be proportional to its proximity in capture time to the current frame (which, in the example of FIG. 6C is frame #19). Since second selected frame 635 is farther from the current frame than first selected frame 615, its boosted weighting value only raises to level 645. In the meantime, the boosted weighting adjustment value 630 of first selected frame 615 has risen above the previous peak weighting value 625 of the current frame shown in FIG. 6B. As mentioned above, in embodiments wherein the area under the weighing function curve is normalized to a constant value, the more selected frames there are in the frame ring buffer at any one time, the lower the weight of the current frame may go to accommodate the boosted weighing values, e.g., the current frame's weight has been lowered to 635 in the example of FIG. 6C.

As mentioned above with reference to FIG. 6B, the second selected frame may also have a number of frames 640 leading up to it that may be combined into a short preview video leading up to the display of the second selected frame 635. In this example, the frames 620 leading up to first selected frame 615 even share an overlap (i.e., frames #25-#26) with the frames 640 leading up to the second selected frame 635. In this type of implementation, as long as there are not too many "selected" frames too close together, the video playback application may be able to create preview videos for each of the selected frames, while only maintaining a single copy of each incoming frame in a "master" video track. If the selected images come too close together, or there is too much stabilization adjustment needed between the selected frames to be able to stay within each frame's overscan region and meet each selected frame's stabilization constraint, the system may simply strive to meet the stabilization constraint of the first selected image and get as close as it can to meeting the second selected image's stabilization constraint. Alternately, if all (or nearly) all of the image frames were selected, an effectively 'unstabilized' video sequence could be produced, in an effort to meet all of the constraints.

In some embodiments, as an alternative to (or in addition to) changing the value of the video stabilization strength parameter in order to account for the motion data of future frames and/or their stabilization constraints, the video stabilization algorithm may also lower the default amount of weighting adjustment 'boost' that is applied to selected frames. Assuming there are one or more selected frames in the image buffer at any given time, lowering the amount by which the selected frames are boosted would allow greater weight to be placed on the current frame (and it's nearby neighbors), thus having the effect of lowering the stabilization strength—and potentially allowing the stabilization trajectory to account for the motion data of future frames and/or their stabilization constraints.

In other embodiments, if the stabilization constraints for one or more future image frames may not be met without lowering the video stabilization strength parameter beyond a threshold amount, the video image stabilization algorithm may prefer to relax one or more of the constraints on one or more of the image frames, rather than lowering the video stabilization strength parameter beyond the threshold amount. By maintaining a 'relaxed' version of the stabilization constraints (e.g., allowing a maximum displacement of +/−8 pixels, rather than a desired +/−4 pixels), the resultant assembled stabilized video sequence may be able to strike an aesthetic balance between honoring the preference of the user to steer the stabilization trajectory towards particular selected frames (though not to the full extent desired by the user), while maintaining a higher overall stabilization strength for the video sequence than could otherwise be used if the stabilization constraint(s) had been meet exactly.

In still other embodiments, if the stabilization adjustment values for a particular frame would take it outside of the frame's overscan region, rather than limiting the frame's Field of View (FOV) to the pixels available in the overscan region, the video stabilization operation may instead repeat out the pixels at the edge of the image in the direction where it ran out of overscan and aggregate them with the existing pixels, so as to maintain the same FOV as the previous image. In other embodiments, rather than repeating the edge pixels out to maintain the FOV, different approaches may be taken, such as repeating out black (or some other color) rows of pixels, or blurring out the values of the edge pixels (e.g., with the values or average values of the corresponding pixels in one or more neighboring frames in the buffer) and aggregating them with the existing pixels, so as to maintain the same FOV of the previous image. The particular technique used to maintain the FOV with the previous image in the event that an image's determined stabilization adjustment values would take it outside of its overscan region may be left up to the aesthetic preferences of a given implementation. These image processing techniques to maintain FOV are discussed in further detail herein with reference to FIG. 9, below.

Figure 6D:
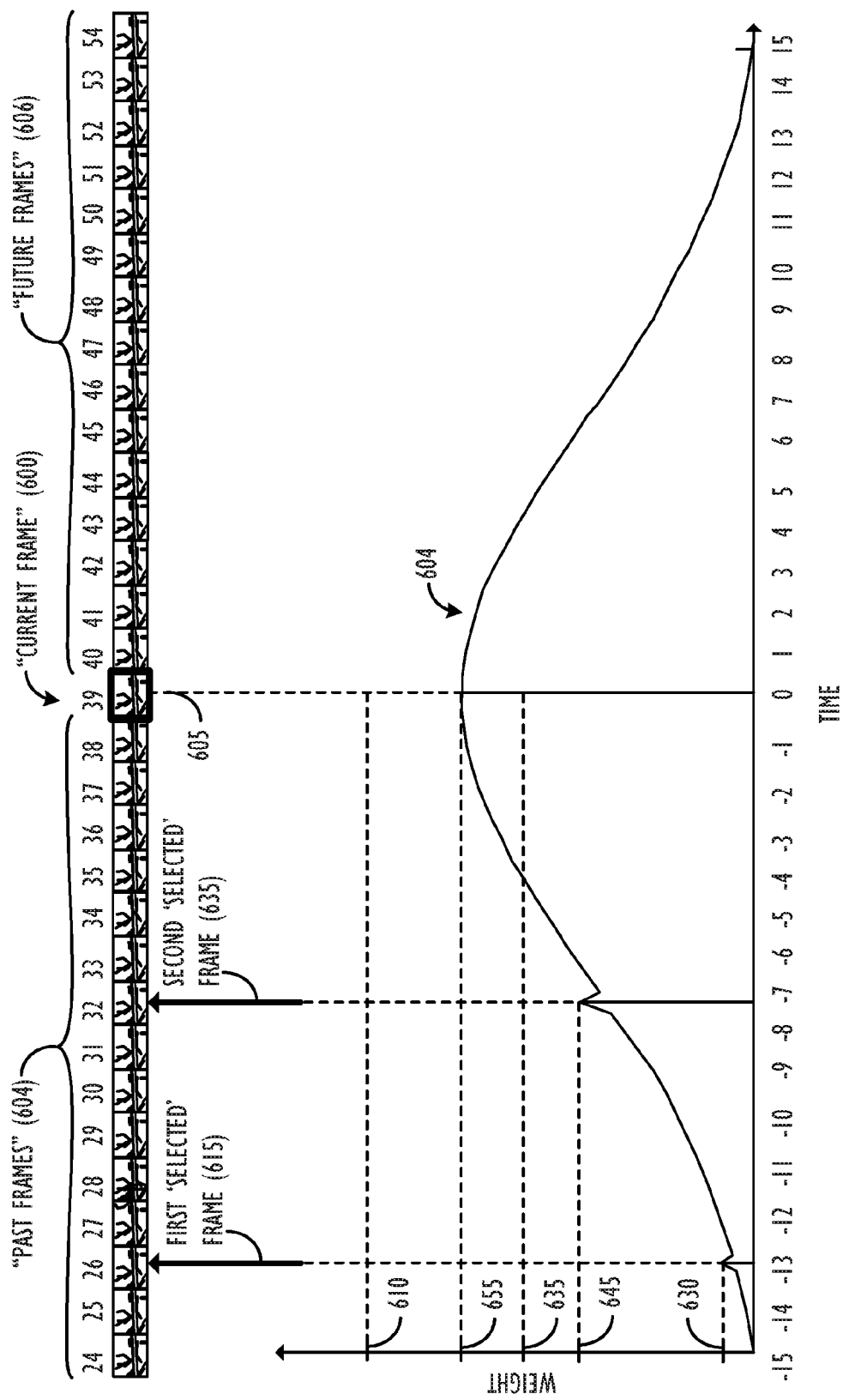

Turning now to FIG. 6D, an adjusted weighting function 604 is shown that represents a later moment in time from the scenario shown and described with reference to FIG. 6C. In particular, in FIG. 6D, the first selected frame 615 (frame #26) has moved into the past frames 604, all the way to position index t=−13 in the frame ring buffer, the second selected frame 635 (frame #32) has moved to position index t=−7 in the past frames 604 of the frame ring buffer, and the current frame 600 at position index t=0 is now frame #39, i.e., the fortieth frame to have been captured since the image capture operations began. As mentioned above, the weighting adjustment boosts applied to the selected frames once they have moved into the past frames may be greatly diminished (and may also still be directly proportional to their proximity to the current frame, i.e., frame #39 in the example of FIG. 6D). Thus, as shown in FIG. 6D, the weighting value for the second selected frame 635 has dropped to weight value 645, and the weighting value for the first selected frame 615 has dropped to weight value 630. These boost reductions has also had the effect of bumping the weight value for the current frame (i.e., t=0) back up to weight value 655, which reflects a larger weight than the current frame enjoyed in the scenario illustrated in FIG. 6C (i.e., wherein large weighting adjustment boosts were still being applied to the first and second selected frames).

Figure 2:
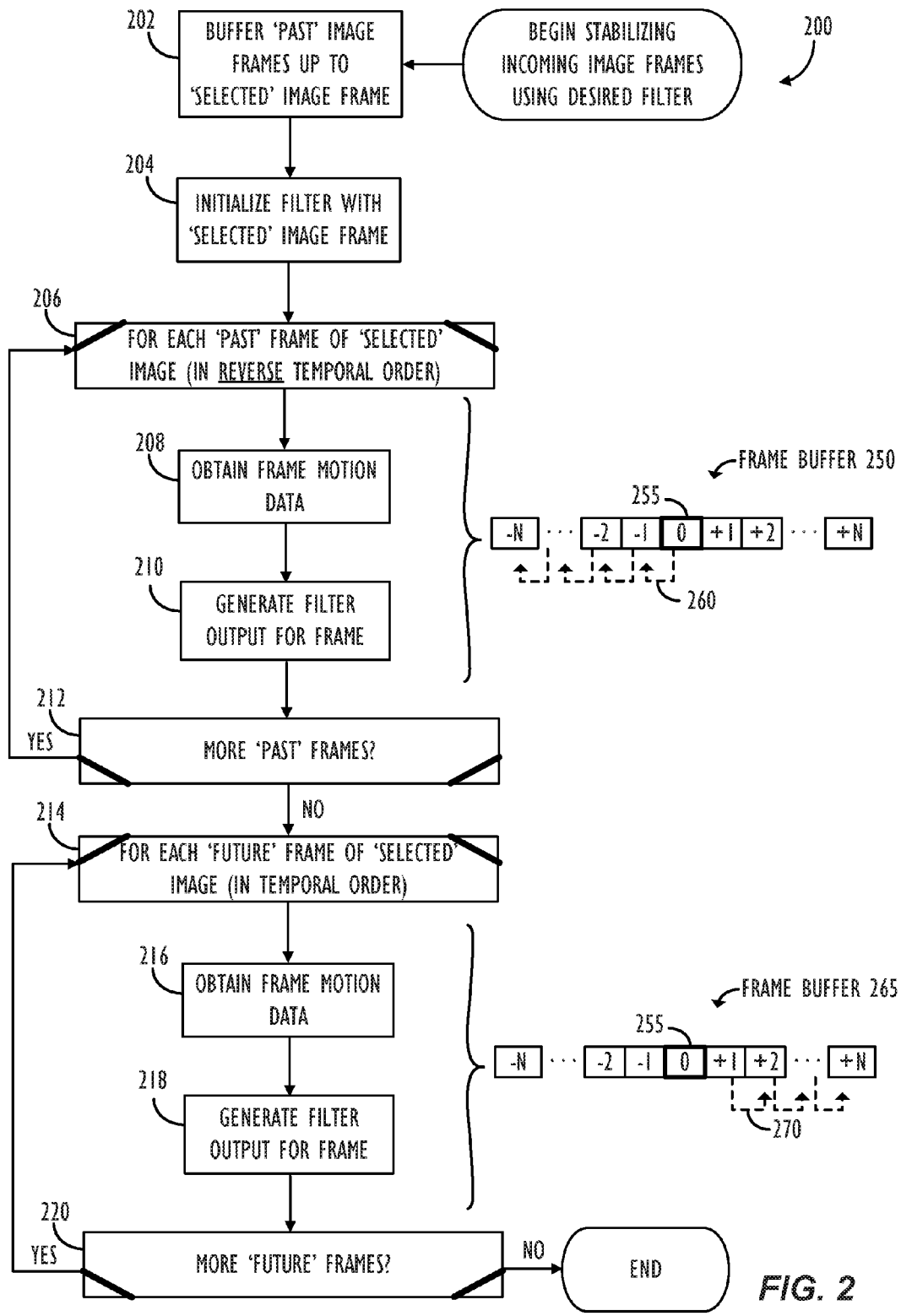
FIG. 2 shows, in flowchart form, a video stabilization operation, in accordance with another embodiment.

Referring now to FIG. 2, a video stabilization operation 200 is shown in flowchart form, in accordance with another embodiment. Operation 200 is referred to herein as "backwards/forwards stabilization," and may be employed as an alternative to the video stabilization operation 100, described above in conjunction with FIGS. 1A-1D. Operation 200 is referred to as "backwards/forwards stabilization" because, in one part, it only looks at "past" frames (with respect to the "current" frame), and does not consider "future" frames, i.e., it stabilizes in a "backwards" direction, and, in another part, it only looks at "future" frames (with respect to the "current" frame), and does not consider "past"

frames, i.e., it stabilizes in a "forwards" direction. Operation 200 may begin by stabilizing incoming image frames using a desired video stabilization technique, e.g., using a filter that combines, in some fashion, the motion data associated with a current incoming frame and the motion data associated with the previous frame, in order to compute smoothed stabilization motion adjustment values for the current frame. Once an image frame has been "selected," operation 200 may proceed by buffering some number of the "past" frames up to the "selected" image frame (block 202). Next, the operation may "initialize" the filter with the "selected" frame from the incoming stream of video frames for the stabilization of the selected frame (block 204). In other words, the output of the filter is set to be the same as the "selected" image, i.e., designating that the selected frame will not be adjusted or stabilized in any fashion during the stabilization process (or, alternately, will only be adjusted in accordance with a constraint for the selected frame, e.g., specifying a maximum allowed displacement for the selected frame). Next, for each "past" frame of the selected frame (moving backward in time—one frame at a time—in "reverse temporal" order) (block 206), the operation 200 may perform the following steps. First, motion data (including, e.g., image capture device motion data and/or image processing-based motion data) may be obtained for the current frame (block 208). Next, the motion data for the current frame may be fed into the filter, and a stabilized output may be generated for the current frame (block 210). This process may then be repeated (block 212), for as long as there are more past frames for the operation to iterate through in reverse temporal order.

Exemplary frame buffer 250 is used in FIG. 2 to illustrate the direction of iteration moving from the "selected" frame 255 "backward" in time, one frame at a time 260 until reaching the end of the frame buffer. Thus, in this example, the sequence of frames to be stabilized would be frame index 0, then −1, then −2, and so forth, until operations reached frame −N.

According to some embodiments, operation 200 may be implemented using an infinite impulse response (IIR) filter. In other words, the filter will start with a "current" frame and then compute a smooth trajectory from the output of the previous frame in the time-sequenced set of images to the current frame based on a weighted combination of the current frame and the previous frame, e.g., a 20% contribution to the stabilization from the position of the current frame and an 80% contribution to the stabilization from the stabilized position of the previous frame. By adjusting the contribution of the previous frame higher or lower than 80%, the operation may either increase or decrease the strength of the video stabilization (i.e., the greater the contribution of the previous frame, the greater the strength of the stabilization that is applied to the video.)

At block 214, operation 200 may begin the "forwards" portion of the "backwards/forwards" stabilization process. In particular, for each "future" frame of the selected frame (moving forward in time—one frame at a time—in "temporal" order) (block 214), the operation 200 may perform the following steps. First, motion data (including, e.g., image capture device motion data and/or image processing-based motion data) may be obtained for the current frame (block 216). Next, the motion data for the current frame may be fed into the filter, and a stabilized output may be generated for the current frame (block 218). This process may then be repeated (block 220), for as long as there are more future frames for the operation to iterate through in temporal order.

Exemplary frame buffer 265 is used in FIG. 2 to illustrate the direction of iteration moving from the "selected" frame 255 "forward" in time, in temporal order, one frame at a time 270, until reaching the end of the frame buffer. Thus, in this example, the sequence of frames to be stabilized would be frame index 0, then +1, then +2, and so forth, until operations reached frame +N.

Surprisingly, the particular order of operation 200 may provide some added memory efficiencies over operation 100 as well, e.g., because there are fewer frames that have to be buffered. For example, by stabilizing the past frames first (and then stabilizing the future frames), only the N "past" frames need to be buffered before they are sent to a video encoder, which may then encode the frames in temporal order. The future frames may then be stabilized one at a time as they become the "current" frame, without the need for further buffering. However, it would also be possible to stabilize the future frames first (and then stabilize the past frames), i.e., reverse the order of the two iterative loops in operation 200. However, in such an embodiment, both the N "past" frames and the N "future" frames would need to be buffered (i.e., 2N+1 frames total) before stabilization operations could begin, thus roughly doubling the amount of memory required, as compared to operating on the past frames first.

Some challenges may be faced when attempting to generalize operation 200 to the scenario wherein multiple image frames are selected, but only one copy/version of the stabilized video sequence is desired to be stored. In particular, the "forward" stabilization portion of the first selected frame would have to, in some way, be reconciled with the "backward" portion of the next selected frame. According to one embodiment, the stabilization operation may simply allow for there to be abrupt motion at the at the junction between the two selected frames. According to other embodiments, however, the "backward" portion of the next selected image frame may be computed first, and then blended/averaged with the "forward" stabilization trajectory of the first designated frame.

Figure 9:
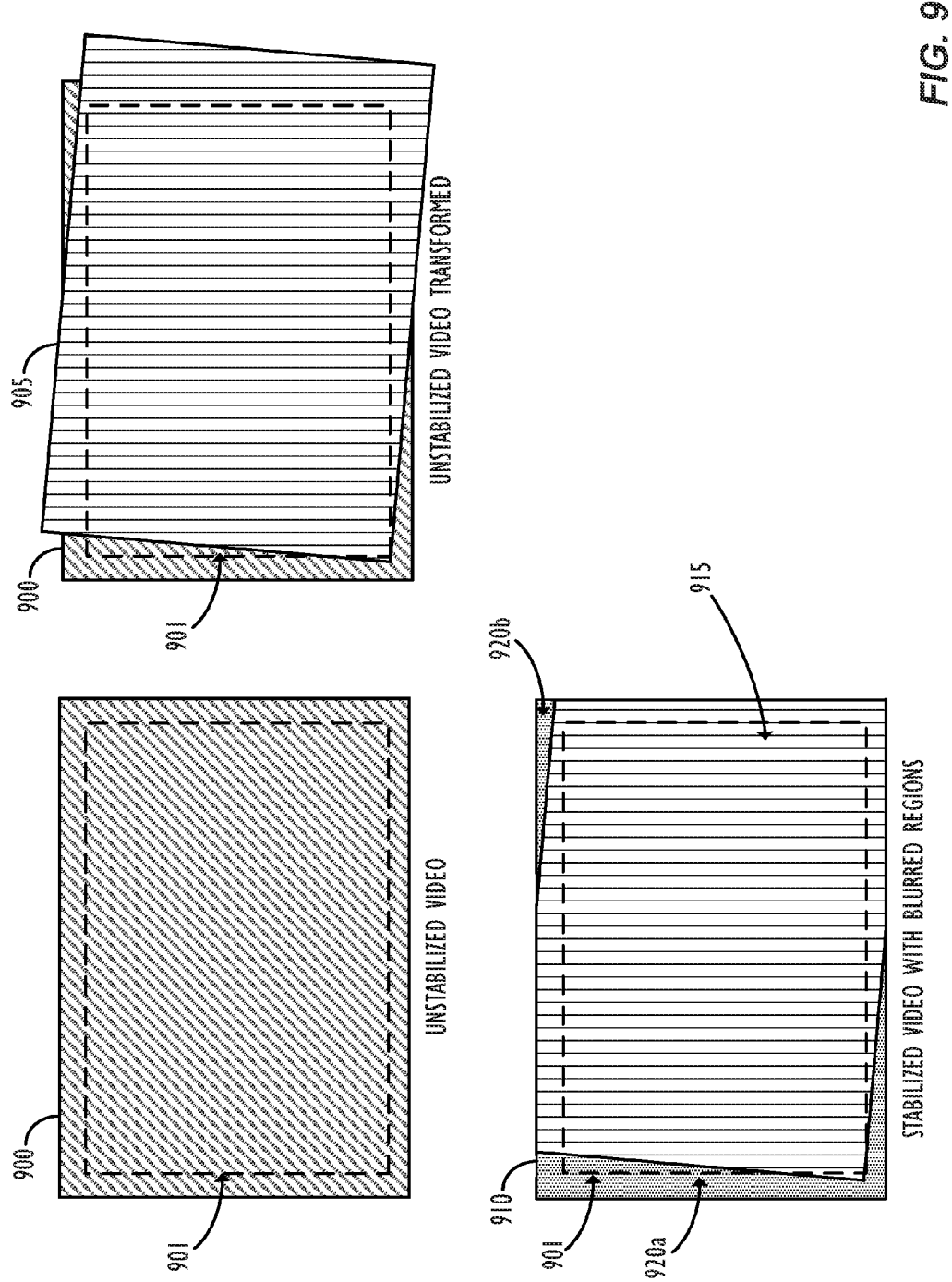
FIG. 9 illustrates approaches for maintaining a constant field of view (FOV) between a stabilized image and the other images in a video sequence, in accordance with some embodiments.

Referring now to FIG. 9, approaches for maintaining a constant FOV between a stabilized image and the other images in a video sequence are illustrated. When maintaining a constant FOV, the stabilized image may need to be translated, rotated, warped, perspective corrected, etc., which may lead to missing and/or duplicated pixels in the FOV of the stabilized image. As discussed above with reference to FIG. 4, each captured frame, e.g., captured frame 900 in FIG. 9, may comprise an outer extent (e.g., a height and width), representing all of the pixels that are actually captured by the image sensor at the moment of capture. However, each frame may also have an overscan region 901 (i.e., the pixels outside of the extent of the dashed line rectangle), representing pixels around the outer edges of the actual visible frames that are displayed to a viewer of the images.

In the example shown in FIG. 9, captured frame 900 represents an unstabilized video frame, as indicated by the diagonal line shading used to fill up frame 900. Image frame 905 represents the transformation of unstabilized video frame 900, as indicated by the vertical line shading used to fill up frame 905. As may be seen, the stabilized version of frame 905 appears to have been rotated clockwise several degrees, and perhaps slightly warped (resulting in the shape of frame 915). Frame 910 represents the stabilized version of video frame 905 that has been cropped to maintain the same FOV with original unstabilized frame 900 (and, presumably, the other frames in the capture video sequence).

Because of the transformation(s) applied to frame 905 during the stabilization process (resulting in the shape of frame 915), frame 910 also has several regions 920 (e.g., region 920a, around the left side of the image data, and discontinuous region 920b, in the upper right corner of the image data, each indicated by the darkly-shaded regions in frame 910) where there is no valid pixel data from frame 915. Thus, according to some embodiments, additional pixels may be aggregated with frame 915 to fill in the regions 920 and maintain a consistent FOV frame.

In this example, the regions 920a and 920b may be filled in by softly blurring the pixel values of the pixels present frame 915 out to the extent of region 910. This blurring approach may create a less noticeable drop off at the edge of frame 915, while still maintaining the same FOV, such that there is no jarring visual jump between image sizes in any resultant assembled stabilized video sequence. According to some embodiments, the entire overscan region 901 may be blurred. According to other embodiments, only the portion of visible "invalid" pixels (i.e., those in regions 920a and 920b) may be blurred. In some embodiments, a region even larger than overscan region 901 (e.g., a region that has twice the thickness of the overscan region around each edge of the image) may be blurred, e.g., in the event that the transformed stabilized frame is displaced beyond the overscan region, so that there are valid pixels to blur the image data (or repeated image data) with. In some embodiments, the blur may comprise at least one of: a fixed radius blur; or an adaptive radius blur (i.e., wherein the radius value increases the farther away it gets from the overscan border).

In still other embodiments, the blur may be blended (e.g., alpha-blended) over a constant area that is larger than the invalid regions (e.g., the entire overscan region, or an area larger than the entire overscan region) and then the resulting blurred pixels may be used only in the invalid regions (e.g., regions 920a and 920b), in order to smooth the transition from image pixels into the invalid regions from frame to frame in a video sequence. In other embodiments, the outer row of "valid" pixels may simply be duplicated out into the invalid regions for the blurring process (e.g., left/right pixels may be duplicated with the last known, i.e., "valid," horizontal pixel, and top/bottom pixels may be duplicated with the last known, i.e., "valid," vertical pixel). In other embodiments, the duplicated pixels may be blurred with the corresponding blurred pixel values of the previous N frames (and/or future N frames) in the video sequence, which may help to reduce the effects of high frequency changes in the blurred region.

Another possible implementation may utilize an image sensor that is designed with certain pixels dedicated for capturing overscan (i.e. placed at the outer edge of the lens optical design, and thus exhibiting worse lens shading and inferior sharpness). These 'dedicated overscan' pixels could then be used for stabilizing the video, while preserving the FOV of the "selected" image.

Figure 10:
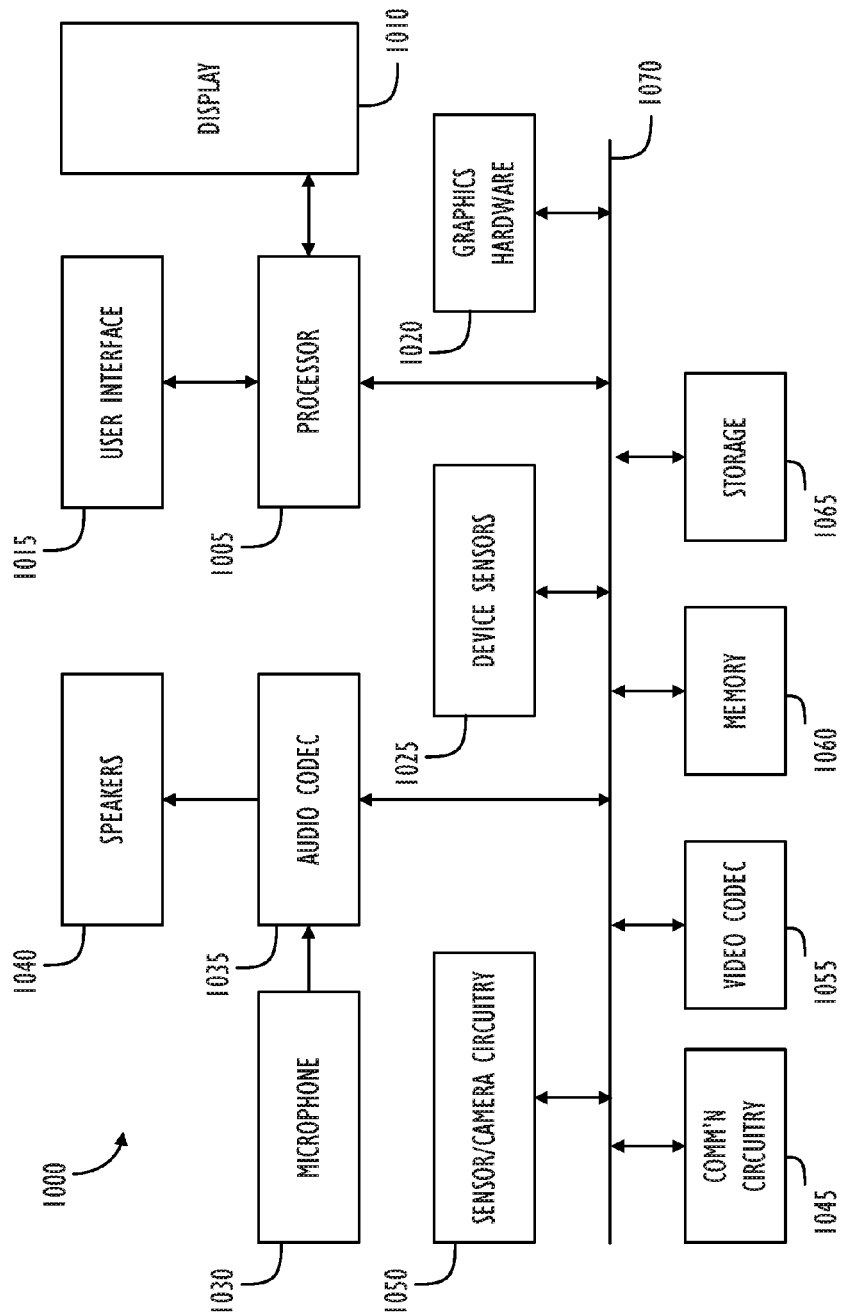
FIG. 10 shows, in block diagram form, a multi-function electronic device, in accordance with one embodiment.

Referring to FIG. 10, a simplified functional block diagram of illustrative electronic device 1000 is shown according to one embodiment. Electronic device 1000 could be, for example, a mobile telephone, personal media device, portable camera, or a tablet, notebook or desktop computer system. As shown, electronic device 1000 may include processor 1005, display 1010, user interface 1015, graphics hardware 1020, device sensors 1025 (e.g., proximity sensor/ambient light sensor, accelerometer and/or gyroscope), microphone 1030, audio codec(s) 1035, speaker(s) 1040, communications circuitry 1045, image capture circuit or unit 1050, video codec(s) 1055, memory 1060, storage 1065, and communications bus 1070.

Processor 1005 may execute instructions necessary to carry out or control the operation of many functions performed by device 1000 (e.g., such as the generation and/or processing of video image frames in accordance with the various embodiments described herein. Processor 1005 may, for instance, drive display 1010 and receive user input from user interface 1015. User interface 1015 can take a variety of forms, such as a button, keypad, dial, a click wheel, keyboard, display screen and/or a touch screen. User interface 1015 could, for example, be the conduit through which a user may view a captured video stream and/or indicate particular frame(s) that the user would like to have a particular stabilization constraint(s) applied to (e.g., by clicking on a physical or virtual button at the moment the desired frame is being displayed on the device's display screen). In one embodiment, display 1010 may display a video stream as it is captured while processor 1005 and/or graphics hardware 1020 and/or image capture circuitry contemporaneously generate a stabilized version of the captured video stream storing the stabilized video stream in memory 1060 and/or storage 1065. In another embodiment, display 1010 may display a stabilized version of a captured video sequence as it is captured (with a delay approximately equal to the buffer system initialization time (see 104 and FIGS. 3A and 3B)). Processor 1005 may be a system-on-chip such as those found in mobile devices and include one or more dedicated graphics processing units (GPUs). Processor 1005 may be based on reduced instruction-set computer (RISC) or complex instruction-set computer (CISC) architectures or any other suitable architecture and may include one or more processing cores. Graphics hardware 1020 may be special purpose computational hardware for processing graphics and/or assisting processor 1005 perform computational tasks. In one embodiment, graphics hardware 1020 may include one or more programmable graphics processing units (GPUs).

Image capture circuitry 1050 may capture video images that may be processed to generate stabilized video in accordance with this disclosure. Output from image capture circuitry 1050 may be processed, at least in part, by video codec(s) 1055 and/or processor 1005 and/or graphics hardware 1020, and/or a dedicated image processing unit incorporated within circuitry 1050. Images so captured may be stored in memory 1060 and/or storage 1065. Memory 1060 may include one or more different types of media used by processor 1005, graphics hardware 1020, and image capture circuitry 1050 to perform device functions. For example, memory 1060 may include memory cache, read-only memory (ROM), and/or random access memory (RAM). Storage 1065 may store media (e.g., audio, image and video files), computer program instructions or software, preference information, device profile information, and any other suitable data. Storage 1065 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 1060 and storage 1065 may be used to retain computer program instructions or code organized into one or more modules and written in any desired computer programming language. When executed by, for example, processor 1005 such computer program code may implement one or more of the methods described herein.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). For example, various smoothing regimes may be used together. Further, FIGS. 1A-1D and 2 show flowcharts illustrating a general video stabilization operation in accordance with the disclosed embodiments. In one or more embodiments, one or more of the disclosed steps may be omitted, repeated, and/or performed in a different order than that described herein. Accordingly, the specific arrangement of steps or actions shown in FIGS. 1A-1D and 2 should not be construed as limiting the scope of the disclosed subject matter. The scope of the invention therefore should be determined with reference to the appended claims, along with the full scope of equivalents to which such claims are entitled.

The invention claimed is:

1. A non-transitory program storage device comprising instructions stored thereon to cause one or more processors to:
    obtain a first time-sequenced set of images, wherein:
        each image in the first time-sequenced set of images has a capture time and motion data;
        one image in the first time-sequenced set of images is designated as a current image;
        a first one or more images within the first time-sequenced set of images having capture times before the current image are designated past images; and
        a second one or more images within the first time-sequenced set of images having capture times after the current image are designated future images;
    select a first image from the first time-sequenced set of images to meet a first stabilization constraint;
    identify a weighting value for each image in the first time-sequenced set of images based, at least in part, on the proximity of the respective image's capture time to the capture time of the current image;
    adjust the identified weighting value for the selected first image according to a first weighting adjustment value;
    identify a first stabilization motion value for the current image in the first time-sequenced set of images based, at least in part, on the identified weighting values and the adjusted weighting value for the selected first image;
    apply the first stabilization motion value to the current image to stabilize the current image; and
    store the stabilized current image in a memory.

2. The non-transitory program storage device of claim 1, wherein the motion data for each image comprises gyroscope information.

3. The non-transitory program storage device of claim 1, wherein the identified weighting value for each image in the first time-sequenced set of images is further based, at least in part, on a stabilization strength parameter value for the current image.

4. The non-transitory program storage device of claim 1, wherein the first weighting adjustment value is further determined based, at least in part, on the proximity of the selected first image's capture time to the capture time of the current image.

5. The non-transitory program storage device of claim 1, wherein the first weighting adjustment value is further determined based, at least in part, on whether the selected first image is presently a past image or a future image.

6. The non-transitory program storage device of claim 1, wherein the first stabilization constraint comprises a maximum allowed displacement for the stabilization of the selected first image.

7. The non-transitory program storage device of claim 1, wherein the instructions to apply the first stabilization motion value to the current image to stabilize the current image further comprise instructions to aggregate one or more pixels with the current image, so as to maintain a consistent Field of View (FOV) between the current image and the other images in the first time-sequenced set of images.

8. A video image stabilization method, comprising:
    obtaining a first time-sequenced set of images, wherein:
        each image in the first time-sequenced set of images has a capture time and motion data;
        one image in the first time-sequenced set of images is designated as a current image;
        a first one or more images within the first time-sequenced set of images having capture times before the current image are designated past images; and
        a second one or more images within the first time-sequenced set of images having capture times after the current image are designated future images;
    selecting a first image from the first time-sequenced set of images to meet a first stabilization constraint;
    identifying a weighting value for each image in the first time-sequenced set of images based, at least in part, on the proximity of the respective image's capture time to the capture time of the current image;
    adjusting the identified weighting value for the selected first image according to a first weighting adjustment value;
    identifying a first stabilization motion value for the current image in the first time-sequenced set of images based, at least in part, on the identified weighting values and the adjusted weighting value for the selected first image;
    applying the first stabilization motion value to the current image to stabilize the current image; and
    storing the stabilized current image in a memory.

9. The method of claim 8, wherein the motion data for each image comprises one or more time stamped gyroscope data points.

10. The method of claim 8, wherein the identified weighting value for each image in the first time-sequenced set of images is further based, at least in part, on a stabilization strength parameter value for the current image.

11. The method of claim 8, wherein the first weighting adjustment value is further determined based, at least in part, on the proximity of the selected first image's capture time to the capture time of the current image.

12. The method of claim 8, wherein the first stabilization constraint comprises a maximum allowed displacement for the stabilization of the selected first image.

13. The method of claim 8, wherein the act of applying the first stabilization motion value to the current image to stabilize the current image further comprises aggregating one or more pixels with the current image, so as to maintain a consistent FOV between the current image and the other images in the first time-sequenced set of images.

14. A video image capture device, comprising:
    an image sensor;

memory communicatively coupled to the image sensor;
one or more motion sensors;
one or more processors operatively coupled to the image sensor, the memory and the one or more motion sensors configured to execute instructions causing the one or more processors to:
  obtain a first time-sequenced set of images, wherein:
    each image in the first time-sequenced set of images has a capture time and motion data;
    one image in the first time-sequenced set of images is designated as a current image;
    a first one or more images within the first time-sequenced set of images having capture times before the current image are designated past images; and
    a second one or more images within the first time-sequenced set of images having capture times after the current image are designated future images;
  select a first image from the first time-sequenced set of images to meet a first stabilization constraint;
  identify a weighting value for each image in the first time-sequenced set of images based, at least in part, on the proximity of the respective image's capture time to the capture time of the current image;
  adjust the identified weighting value for the selected first image according to a first weighting adjustment value;
  identify a first stabilization motion value for the current image in the first time-sequenced set of images based, at least in part, on the identified weighting values and the adjusted weighting value for the selected first image;
  apply the first stabilization motion value to the current image to stabilize the current image; and
  store the stabilized current image in a memory.

15. The video image capture device of claim 14, wherein the motion data for each image comprises gyroscope information.

16. The video image capture device of claim 14, wherein the identified weighting value for each image in the first time-sequenced set of images is further based, at least in part, on a stabilization strength parameter value for the current image.

17. The video image capture device of claim 14, wherein the first weighting adjustment value is further determined based, at least in part, on the proximity of the selected first image's capture time to the capture time of the current image.

18. The video image capture device of claim 14, wherein the first weighting adjustment value is further determined based, at least in part, on whether the selected first image is presently a past image or a future image.

19. The video image capture device of claim 14, wherein the first stabilization constraint comprises a maximum allowed displacement for the stabilization of the selected first image.

20. The video image capture device of claim 14, wherein the instructions to cause the one or more processors to apply the first stabilization motion value to the current image to stabilize the current image further comprise instructions to aggregate one or more pixels with the current image, so as to maintain a consistent Field of View (FOV) between the current image and the other images in the first time-sequenced set of images.

* * * * *